United States Patent
Seethaler et al.

(10) Patent No.: US 11,972,899 B2
(45) Date of Patent: Apr. 30, 2024

(54) SOLENOID APPARATUS AND METHODS

(71) Applicants: THE UNIVERSITY OF BRITISH COLUMBIA, Vancouver (CA); WESTPORT FUEL SYSTEMS CANADA INC., Vancouver (CA)

(72) Inventors: Rudolf Seethaler, Kelowna (CA); Bradley Reinholz, Kelowna (CA); Gordon McTaggart-Cowan, Vancouver (CA); Ashish Singh, Surrey (GB); Devin Reinholz, Kelowna (CA)

( * ) Notice: Subject to any disclaimer, the term of this patent is extended or adjusted under 35 U.S.C. 154(b) by 269 days.

(21) Appl. No.: 17/441,659
(22) PCT Filed: Mar. 20, 2020
(86) PCT No.: PCT/CA2020/050368
§ 371 (c)(1),
(2) Date: Sep. 21, 2021
(87) PCT Pub. No.: WO2020/186358
PCT Pub. Date: Sep. 24, 2020

(65) Prior Publication Data
US 2022/0148784 A1    May 12, 2022

Related U.S. Application Data

(60) Provisional application No. 62/820,937, filed on Mar. 20, 2019.

(51) Int. Cl.
*H01F 7/16* (2006.01)
*G01D 5/22* (2006.01)
(Continued)

(52) U.S. Cl.
CPC ............. *H01F 7/16* (2013.01); *G01D 5/2216* (2013.01); *H01F 7/1844* (2013.01);
(Continued)

(58) Field of Classification Search
CPC .. H01F 7/16; H01F 7/1844; H01F 2007/1692; H01F 2007/185; H01F 7/066;
(Continued)

(56) References Cited

U.S. PATENT DOCUMENTS 4,157,521 A    6/1979 Leland
4,463,332 A    7/1984 Everett
(Continued)

FOREIGN PATENT DOCUMENTS

DE    102010063981    6/2012
EP    346758    12/1989
(Continued)

OTHER PUBLICATIONS

International Searching Authority—Patent Cooperation Treaty, PCT/CA2020/050368 International Search Report and Written Opinion dated Jul. 22, 2020, The University of British Columbia, Canada.

*Primary Examiner* — Mohamad A Musleh
(74) *Attorney, Agent, or Firm* — Richard D. Okimaw

(57) ABSTRACT

There is a solenoid including a stator having a first stator tooth and a second stator tooth, and an armature having a first armature tooth and a second armature tooth. The armature is moveable with respect to the stator over a predetermined stroke. A coil is associated with one of the stator and the armature for conducting an electric current and generating magnetic flux that is guided by the stator and the armature. The stator or the armature acts as a ferromagnetic core for the coil. There is a first air-gap between the first stator tooth and the first armature tooth that has a first length, and a second air-gap between the second stator tooth and the second armature tooth that has a second length. The first and second lengths are constant to within a predetermined margin over the predetermined stroke when the first and second armature teeth overlap the first and second stator teeth respectively.

39 Claims, 16 Drawing Sheets

(51) Int. Cl.
*H01F 7/18* (2006.01)
*F16K 31/06* (2006.01)
*F16K 37/00* (2006.01)

(52) U.S. Cl.
CPC ...... *F16K 31/0679* (2013.01); *F16K 37/0041* (2013.01); *H01F 2007/1692* (2013.01); *H01F 2007/185* (2013.01)

(58) Field of Classification Search
CPC ....... H01F 7/1638; H01F 7/14; G01D 5/2216; G01D 5/2013; F16K 31/0679; F16K 37/0041
See application file for complete search history.

(56) References Cited

U.S. PATENT DOCUMENTS

| | | | |
|---|---|---|---|
| 4,586,013 | A | 4/1986 | Linker |
| 4,651,118 | A | 3/1987 | Zeuner |
| 4,945,269 | A | 7/1990 | Kamm |
| 6,224,033 | B1 | 5/2001 | Kumar |
| 2002/0008603 | A1* | 1/2002 | Seale ............... H01F 7/1844 335/266 |
| 2010/0182112 | A1 | 7/2010 | Nagasaki |

FOREIGN PATENT DOCUMENTS

| | | | |
|---|---|---|---|
| EP | 0736882 | 10/1996 | |
| WO | 2010072908 | 7/2010 | |
| WO | WO-2012084682 A1 * | 6/2012 | ............. F02D 41/20 |
| WO | 2015031894 | 3/2015 | |

* cited by examiner

SOLENOID APPARATUS AND METHODS

FIELD OF THE INVENTION

The present application relates to a solenoid apparatus that can be configured to be either or both an electromagnetic actuator and position sensor and methods of operating the same.

BACKGROUND OF THE INVENTION

So called variable air-gap solenoids in one simple form include a stator, an armature and a coil. As used herein an armature is also referred to interchangeably as a plunger. An electromagnet is formed that attracts the armature towards the stator when the coil is energized with a current. The armature is attracted towards the stator in order to reduce the reluctance of a magnetic path for magnetic field lines of the electromagnet. As the armature moves towards the stator a length of an air-gap between the armature and stator decreases. As a result of the variable-length air-gap the forces exerted on the armature by the electromagnet are highly non-linear throughout the stroke length of the armature. The non-linear force acting on the armature makes it difficult to control the position of the armature and typically these types of solenoids are operated between two extreme positions. For example, when the variable air-gap solenoid is employed to move a plunger of an electromechanical valve the plunger moves between a closed position and an open position of the valve. Attempts to control the plunger position to one or more intermediate positions between the closed and open positions has required expensive and bulky electronic control and position sensing apparatuses that provided only moderate accuracy in detecting the position of the plunger and in controlling the plunger's position, velocity and acceleration.

Conventional proportional solenoids have relatively linear inductance and force characteristics. However, proportional solenoids have a limiting geometry that precludes their use in many applications. For example, proportional solenoids have inherent end stops in that when driven to an end of stroke a plunger rests against a stator. The end stops make proportional solenoids difficult to stack into stages to create more force. Also, achieving linear characteristics requires a very sensitive design of a taper of the plunger. Linear switched reluctance motors (LSRM) have a geometry that results in highly nonlinear force and inductance characteristics.

The state of the art is lacking in techniques for improving the ability to control and/or sense the position of a plunger in an actuator. The present apparatuses and methods provide an improved actuator and/or sensor, and techniques for improving the control and/or sensing of the position of a plunger in an actuator.

SUMMARY OF THE INVENTION

An improved solenoid includes a stator having a first stator tooth and a second stator tooth, and an armature having a first armature tooth and a second armature tooth. The armature is moveable with respect to the stator over a predetermined stroke. A coil is associated with one of the stator and the armature for conducting an electric current and generating magnetic flux that is guided by the stator and the armature. The stator or the armature acts as a ferromagnetic core for the coil. There is a first air-gap between the first stator tooth and the first armature tooth that has a first length, and a second air-gap between the second stator tooth and the second armature tooth that has a second length. The first and second lengths are constant to within a predetermined margin over the predetermined stroke when the first and second armature teeth overlap the first and second stator teeth respectively.

The armature can move or translate linearly along an axis, or alternatively, the armature can rotate about the axis. In an exemplary embodiment the first length of the first air-gap and the second length of the second air-gap are equal to within the predetermined margin. Preferably, widths of the first and second stator teeth are equal to widths of the first and second armature teeth respectively. The stator can surround the armature. Alternatively, the stator can be adjacent to only one side of the armature. In some embodiments the stator can have a cuboid shape or a cylindrical shape. An armature guide associated with the armature can be employed to guide the armature along a longitudinal axis to within a predetermined tolerance over the predetermined stroke.

Each of the first and second stator teeth include a stator-tooth face and each of the first and second armature teeth include an armature-tooth face, whereby each of the first and second armature teeth overlaps the first and second stator teeth respectively when any perpendicular projection emanating from the armature-tooth face intersects the respective stator-tooth face. A first position of the armature is defined as a minimum amount of overlap between the first and second stator teeth and the first and second armature teeth respectively and a second position of the armature is defined as a maximum amount of overlap between the first and second stator teeth and the first and second armature teeth respectively. The predetermined stroke is within the first position and the second position, and a force of the solenoid is constant to within a first predetermined tolerance over the predetermined stroke, and an inductance of the solenoid is linearly proportional to an amount of overlap between the first and second stator teeth and the first and second armature teeth respectively to within a second predetermined tolerance over the predetermined stroke. An amount of overlap between the first and second stator teeth and the first and second armature teeth respectively is linearly proportional to a position of the armature over the predetermined stroke.

In an exemplary embodiment, the solenoid also includes a third stator tooth and a fourth stator tooth associated with the stator, and a third armature tooth and a fourth armature tooth associated with the armature. There is a third air-gap between the third stator tooth and the third armature tooth that has a third length, and a fourth air-gap between the fourth stator tooth and the fourth armature tooth that has a fourth length. The third and fourth lengths are constant to within the predetermined margin over the predetermined stroke when the third and fourth armature teeth overlap the third and fourth stator teeth respectively. Preferably, a distance between the first stator tooth and the third stator tooth is greater than at least one of a width of the first armature tooth and a width of the third armature tooth. Also, preferably, a distance between the first armature tooth and the third armature tooth is greater than at least one of a width of the first stator tooth and a width of the third stator tooth. The armature can include a joining member connecting the first and second armature teeth to the third and fourth armature teeth, and the joining member can be made from a non-ferromagnetic material. In an exemplary embodiment there is a first flux pathway including the first and second air-gaps, and a second flux pathway including the third and fourth air-gaps, where the first flux pathway is parallel to the second flux pathway. There can be yet a third flux pathway including fifth and sixth air-gaps and a fourth flux pathway including seventh and eighth air-gaps, whereby the first flux pathway is in series to the third flux pathway and the second flux pathway is in series to the fourth flux pathway, and the first and third flux pathways are parallel to the second and fourth flux pathways.

In another exemplary embodiment there is a first flux pathway including the first and second air-gaps, and a second flux pathway including the third and fourth air-gaps, where the first flux pathway is in series to the second flux pathway. The stator can include a first portion and a second portion, and where the coil is a first coil associated with the first portion of the stator. There can be a second coil associated with the second portion of the stator. There can be yet a third flux pathway including fifth and sixth air-gaps and a fourth flux pathway including seventh and eighth air-gaps, where the third flux pathway is parallel to the fourth flux pathway, and the first and second flux pathways are in series with the third and fourth flux pathways.

In yet another exemplary embodiment, the solenoid is a first solenoid, and further including a second solenoid having identical features as the first solenoid, and further including a common armature having a joining member connecting the armature of the first solenoid with the armature of the second solenoid. Adjacent plunger teeth are those of the first, second, third and fourth armature teeth of the first solenoid that are adjacent to those of the first, second, third and fourth armature teeth of the second solenoid along the common armature. Preferably, a distance between the adjacent plunger teeth is at least equal to a width of at least one of the adjacent plunger teeth. The first solenoid can be configured with respect to the second solenoid such that when the coils of the first and second solenoids are energized they exert forces or torques that pull or rotate respectively the common armature in opposite directions. The first and second armature teeth can be configured with respect to the first and second stator teeth of the first solenoid spatially differently than how the first and second armature teeth are configured with respect to the first and second stator teeth of the second solenoid. More particularly, the first and second armature teeth of the first solenoid extend along or rotate around a longitudinal axis of the armature with respect to the first and second stator teeth of the first solenoid respectively in an opposite direction compared to how the first and second armature teeth of the second solenoid extend along or rotate around the longitudinal axis with respect to the first and second stator teeth of the second solenoid respectively. The coil of the first solenoid includes windings and the coil of the second solenoid includes windings, whereby the coils of the first and second solenoids can include an equal number of respective windings, such that when the coils of the first and second solenoids are energized with equal currents they exert forces or torques having a common magnitude to within a range of tolerance. The coil of the first solenoid can be energized with an electric current independently and separately from the coil of the second solenoid. The coils of the first and second solenoids are electrically connected.

An improved a driver is configured to generate a primary control signal and a ripple signal, and includes an adder to superimpose the ripple signal onto the primary control signal thereby providing an output signal (or driving signal) that is supplied to the solenoid to actuate the solenoid. The primary control signal can include a bias voltage and can be a DC voltage. A frequency of the ripple signal is preferably above a predetermined value such that aliasing does not occur with the primary control signal or with a back electromotive force generated by applying the output signal to the solenoid.

An improved electronic controller is programmed to measure a voltage across the coil; measure a current through the coil; and estimate a position of the armature by employing an inductance-based algorithm providing a first standalone position estimate and either a flux-linkage-based algorithm or a back-electromotive-force (BEMF)-based algorithm providing a second standalone position estimate; and determine a combined estimate of the armature by employing a meta-estimation algorithm that combines the first standalone position estimate and the second standalone position estimate and provide a combined position estimate.

An improved solenoid including a split-core armature having a first core, a second core and a joining member connecting the first core with the second core. The joining member can be made from a non-ferromagnetic material. The split-core armature configured to move along a longitudinal axis. A first coreless-electromagnet includes a first coil extending around the longitudinal axis. The first core and the coil form a first actuator, where the first core has a north pole and a south pole when the first coil is energized. A second coreless-electromagnet includes a second coil extending around the longitudinal axis. The second core and the second coil form a second actuator, where the second core has a north pole and a south pole when the second coil is energized. There is a first air-gap and a second air-gap. The first coil and the second coil are configured in one of the following ways: (1) the first air-gap extends between the north pole and the south pole of the first core whereby magnetic flux that leaves the north pole of the first core enters the south pole of the first core, and the second air-gap extends between the north pole and the south pole of the second core whereby magnetic flux that leaves the north pole of the second core enters the south pole of the second core when the first and second coils are energized; and (2) the first air-gap extends between the north pole and the south pole of the first core and the second core respectively whereby magnetic flux that leaves the north pole of the first core enters the south pole of the second core, and the second air-gap extends between the north pole and the south pole of the second core and the first core respectively whereby magnetic flux that leaves the north pole of the second core enters the south pole of the first core when the first and second coils are energized. The first coil and the second coil are spaced apart along the longitudinal axis. The first core is configured with respect to the first coil and the second core is configured with respect to the second coil such that when the first and second coils are energized the first actuator exerts a first force that pulls the split-core armature in an opposite direction than a second force exerted by the second actuator on the split-core armature. The first coil has first windings and the second coil has second windings, whereby a first number of first windings can equal a second number of second windings. The first coil can be electrically connected to the second coil.

An improved method of estimating a position of an armature in a solenoid that has a coil includes measuring a voltage across the coil of the solenoid and providing a measured voltage signal; measuring a current through the coil of the solenoid and providing a measured current signal; determining a first position estimation of the armature with a first position estimation algorithm that employs the measured voltage signal and the measured current signal as inputs; determining a second position estimation of the armature with a second position estimation algorithm that employs the measured voltage signal and the measured current signal as inputs; and determining a third position estimation of the armature with a meta-estimation algorithm that employs the first position estimation and the second position estimation as inputs. The first position estimation algorithm can be an inductance-based algorithm and the second position estimation algorithm can be one of a flux-linkage-based algorithm or a BEMF-based algorithm. The meta-estimation algorithm can include a complementary filter or a Kalman filter.

The first position estimate can be determined in the first position estimation algorithm according to the following formula:

$$y = \frac{\sqrt{\left(\frac{U_{rms_{filtered}}}{I_{rms_{filtered}}}\right)^2 - R^2}}{2\pi f C_1} - C_2$$

where:
- $U_{rms_{filtered}}$ is a root mean square value of the measured voltage signal after the measured voltage signal is bandpass filtered;
- $I_{rms_{filtered}}$ is a root mean square value of the measured current signal after the measured current signal is bandpass filtered;
- R is a resistance of the coil;
- f is a ripple frequency of the measured voltage signal;
- $C_1$ is a constant representative of a slope of an inductance of the solenoid versus a position of the armature curve; and
- $C_2$ is a constant representative of a y-intercept of the inductance of the solenoid versus the position of the armature curve.

The second position estimate can be determined in the second position estimation algorithm according to the following formula:

$$y_n = \int \frac{U - RI - C_1(y_{n-1} + C_2)\dot{I}}{C_1 I}$$

where:
- U is the measured voltage signal;
- I is the measured current signal;
- $\dot{I}$ is a derivative of the measured current signal;
- R is a resistance of the coil;
- $C_1$ is a constant representative of a slope of an inductance of the solenoid versus a position of the armature curve; and
- $C_2$ is a constant representative of a y-intercept of the inductance of the solenoid versus the position of the armature curve.

The second position estimate can be determined in the second position estimation algorithm according to the following formula:

$$y = \frac{\int U - RI}{I C_1} - C_2$$

where:
- U is the measured voltage signal;
- I is the measured current signal;
- R is a resistance of the coil;
- $C_1$ is a constant representative of a slope of an inductance of the solenoid versus a position of the armature curve; and
- $C_2$ is a constant representative of a y-intercept of the inductance of the solenoid versus the position of the armature curve.

The solenoid can include a first actuator and a second actuator that exert forces on the armature in opposite directions, such that the coil and the first, second and third position estimates correspond to the first actuator, and where the second actuator has a second coil. The method can include determining for the second actuator fourth, fifth and sixth position estimates of the armature according to how the first, second and third positions estimates respectively were determined; and determining a differential position estimate according to the following formula:

$$y_{diff} = \frac{y_1 + S - y_2}{2}$$

where:
- $y_1$ is one of the first position estimate, the second position estimate or the third position estimate;
- $y_2$ is one of the fourth position estimate, the fifth position estimate or the sixth position estimate; and
- S is a total stroke length of the armature of the solenoid.

DETAILED DESCRIPTION OF PREFERRED EMBODIMENT(S)

The present invention relates to a new type of solenoid that is referred to herein interchangeably as a constant air-gap solenoid (CAS). The CAS in one embodiment can be operated as an electromagnetic actuator that can also be employed to simultaneously measure the position of an armature in the solenoid. As used herein, an armature refers to a magnetic core or a plurality of magnetic cores of a solenoid that move. More particularly, the armature refers to a plunger when linear motion of the armature is employed and to a rotor when rotary motion of the armature is employed. The term armature is used interchangeably with plunger and rotor herein. Through careful design of the armature and a stator, the CAS can exhibit substantially improved linear operation (in both linear motion and rotary motion solenoids) compared to previous solenoids including a proportional inductance change with respect to position and a substantially constant force over its constrained stroke length for a supplied current. The linear inductance and force characteristics of the CAS provide a foundation for the CAS to not only actuate the armature to move, but to also sense its position.

Unlike other electromagnetic actuators, different position detection algorithms can be employed to produce two simultaneous position estimates of the armature of the CAS. These position estimates can then be used for position feedback to control the movement and position of the armature. To produce the simultaneous position estimates, only information from a single voltage and current sensor are employed. The presence of a voltage and current sensor allows the CAS to employ numerous position-sensing algorithms that have been published for LSRMs, reluctance motors, conventional solenoids, differential variable reluctance transducers (DVRT), linear variable differential transformers (LVDTs) and other inductive-based sensors. However, the unique linear behavior of the CAS allows it to employ additional novel methods to estimate position.

Figure 1:
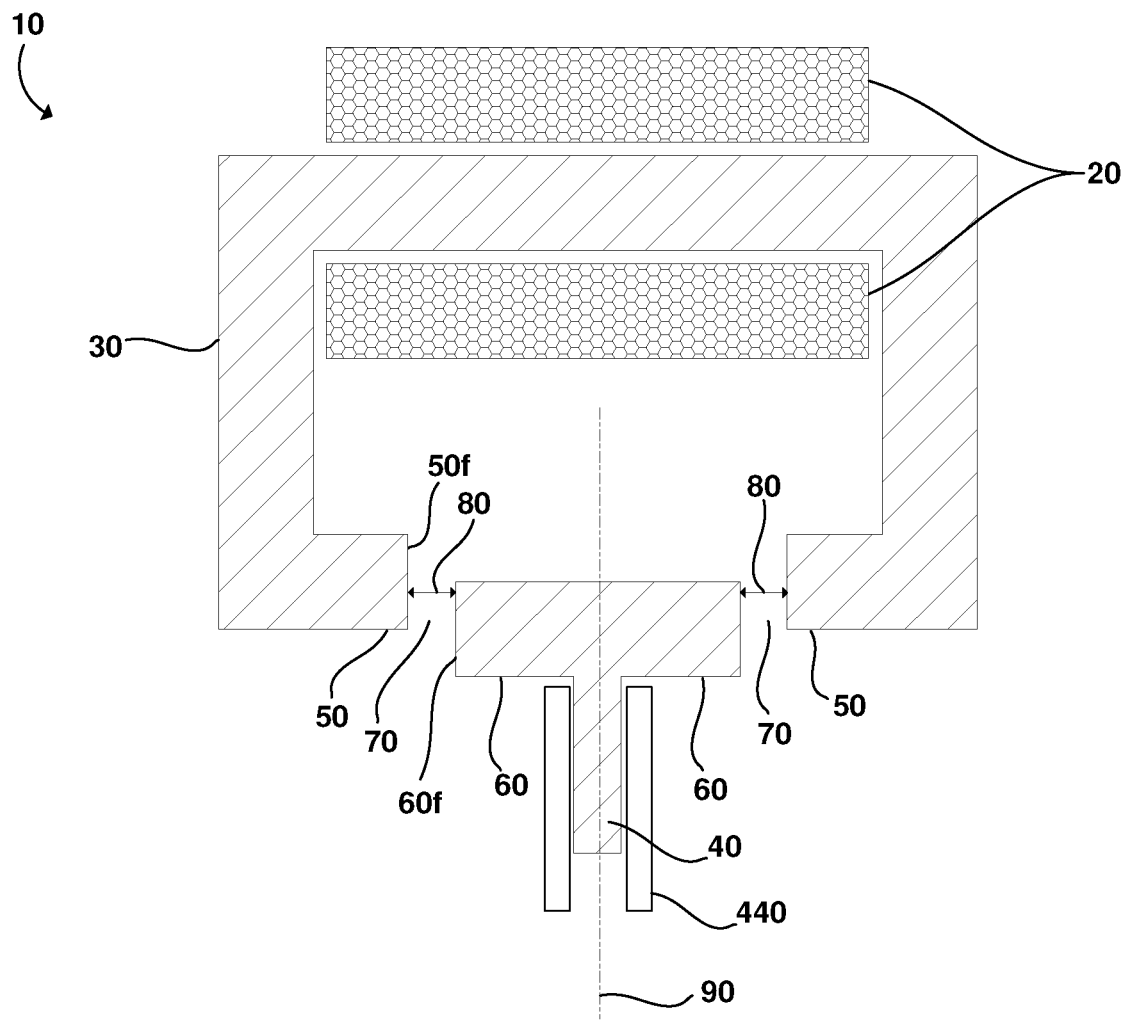
FIG. 1 is a cross-sectional schematic view of a solenoid according to an embodiment.

Referring now to the figures, and first to FIG. 1, there is shown solenoid 10, also referred to as a CAS, according to an embodiment. Solenoid 10 includes coil 20, stator 30 and plunger 40. Coil 20 includes wire formed into windings for conducting an electric current. Stator 30 includes teeth 50 (two in the present embodiment) and plunger 40 includes teeth 60 (also two in the present embodiment). Each stator tooth 50 is associated with a respective plunger tooth 60 and forming stator-plunger-tooth pairs. Both stator 30 and plunger 40 are made of ferromagnetic material(s) to channel and guide magnetic flux generated when coil 20 is energized. As used herein, the term "magnetic flux" can be used interchangeably with the term "flux". Air-gaps 70 exist between each stator tooth 50 and its respective plunger tooth 60. Length 80 of each air-gap 70 remains substantially constant, and preferably constant, as plunger tooth 60 moves relative to its respective stator tooth 50. In an exemplary embodiment stator teeth 50 and plunger teeth 60 remain overlapped throughout their relative movement with respect to each other, and in this circumstance a maximum translation of plunger 40 is defined by a size of stator teeth 50 and plunger teeth 60. This overlap constraint can be met through additional end stops or position control. An exemplary embodiment does not include any inherent end stops unlike a proportional face solenoid. Each stator tooth 50 has stator-tooth face 50f and each plunger tooth 60 has plunger-tooth face 60f In exemplary embodiments faces 50f and 60f are flat and parallel. As used herein plunger tooth 60 is defined to overlap its respective stator tooth 50 when at least one perpendicular projection emanating from plunger-tooth face 60f intersects any portion of stator-tooth face 50f (and similarly with all other enumerated plunger and stator teeth). Similarly, when all perpendicular projections emanating from plunger-tooth face 60f do not intersect any portion of stator-tooth face 50f then plunger tooth 60 does not overlap stator tooth 50. It is difficult to manufacture solenoid 10, and all solenoids disclosed herein, such that faces 50f and 60f are perfectly parallel due to tolerances inherent in manufacturing. In this regard, in general length 80 of air-gap 70 is equal to the shortest length between overlapped portions of stator-tooth face 50f and plunger-tooth face 60f.

As a current is supplied to coil 20, a force is exerted on plunger 40 that acts to pull the plunger into a position where plunger teeth 60 and stator teeth 50 are maximally overlapped (a situation where the magnetic reluctance of a magnetic circuit defined stator 30, plunger 40 and air-gaps 70 is at or near a minimum). A magnitude of the current supplied determines a force exerted on plunger 40. A polarity of the current has no effect on the direction of force applied. An external force must be supplied through a means such as, but not limited to, a mechanical spring to return plunger 40 to a position with less overlap compared to the maximally overlapped position.

In an exemplary embodiment solenoid 10 illustrated in FIG. 1 has a cuboid shape. Stator 30 and plunger 40 are each preferably fabricated from ferromagnetic laminations or made of a sintered ferromagnetic powdered core. Alternatively, either or both stator 30 and plunger 40 can be made from solid ferromagnetic material(s), but in this circumstance higher-order magnetic effects, such as eddy currents, may need to be mitigated.

Plunger 40 as shown in FIG. 1 illustrates an exemplary embodiment of plunger teeth 60 positioned in between stator teeth 50 such that length 80 of air-gaps 70 on each side of the plunger is equivalent. This position of plunger 40 results in a horizontal net force (relative to the orientation of FIG. 1) acting on the plunger to be zero when coil 20 is energized. When lengths 80 of air-gap 70 on each side of plunger 40 are unequal, plunger 40 experiences a horizontal force when coil 20 is energized that acts to pull plunger 40 towards one of stator teeth 50 such that the difference between lengths 80 is reduced to zero. It is challenging and expensive to fabricate solenoid 10 where air-gaps 70 have exactly and precisely equal lengths 80. As a consequence, an exemplary embodiment employs external plunger guide 440 to constrain motion of plunger 40 to its intended axis 90 of motion, although plunger guide 440 is not a requirement. Alternatively, in other embodiments (herein and otherwise) it is also possible that stator 30 moves instead of the plunger 40 (although by definition typically the stator is fixed in position and the plunger moves), in which case stator 30 could move with or without the coil 20, and which can employ external stator guides (not shown).

A desired peak plunger force and a desired degree of linearity of operation of the solenoid influence the selection of lengths 80 of each air-gap 70. A maximum longitudinal plunger force (along axis 90) is directly proportional to length 80 of the air-gaps 70, since the larger the air-gap 70 the larger the maximum longitudinal force that can be exerted on plunger 40 before saturation of the magnetic circuit. As lengths 80 of air-gaps 70 get larger, the linearity of the operation of the solenoid decreases due to more substantial magnetic flux fringing around stator teeth 50 and plunger teeth 60. Therefore, lengths 80 of air-gaps 70 are application-specific in terms of the force, size and linearity requirements. Generally, the discrepancy between lengths 80 of air-gaps 70 on each side of plunger 40 are reduced and preferably minimized, but the discrepancy is fundamentally limited by an acceptable deflection of plunger 40 caused by the horizontal forces that would be experienced when coil 20 is energized.

Figure 2:
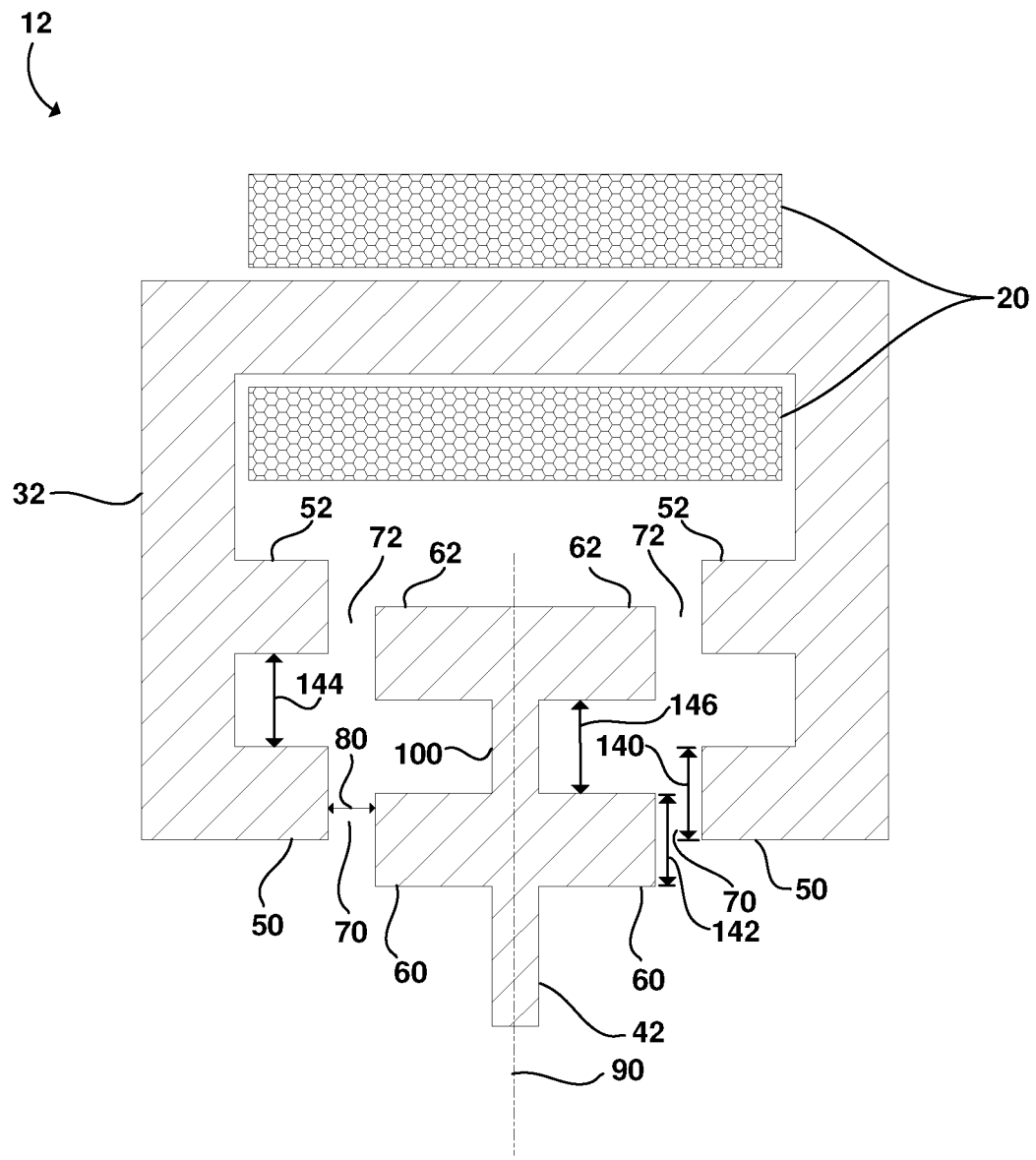
FIG. 2 is a cross-section schematic view of a solenoid employing parallel-stator air-gaps according to another embodiment.

Referring now to FIG. 2, there is shown solenoid 12 according to another embodiment of a constant air-gap solenoid where like parts with the previous embodiment and all other embodiments herein have like reference numerals, and may not be described in any further detail and only differences are discussed. Stator 32 includes a parallel set of stator teeth 52 in addition to stator teeth 50, and plunger 42 includes a corresponding parallel set of plunger teeth 62 in addition to plunger teeth 60. Air-gaps 72 extend between respective stator teeth 52 and plunger teeth 62. A first flux pathway is formed by stator teeth 50, air-gaps 70 and plunger teeth 60 that is parallel to a second flux pathway formed by stator teeth 52, air-gaps 72 and plunger teeth 62. Parallel air-gaps 70 and 72 split magnetic flux within stator 32 between the first flux pathway and the second flux pathway. This alteration to the flux path produces a different force and inductive behavior compared to solenoid 10 shown in FIG. 1. Member 100 joins plunger teeth 60 and 62, and can be made from a common piece of material with the plunger teeth, or a separate piece of material, and can be a ferromagnetic material or a non-magnetic material.

Figure 3:
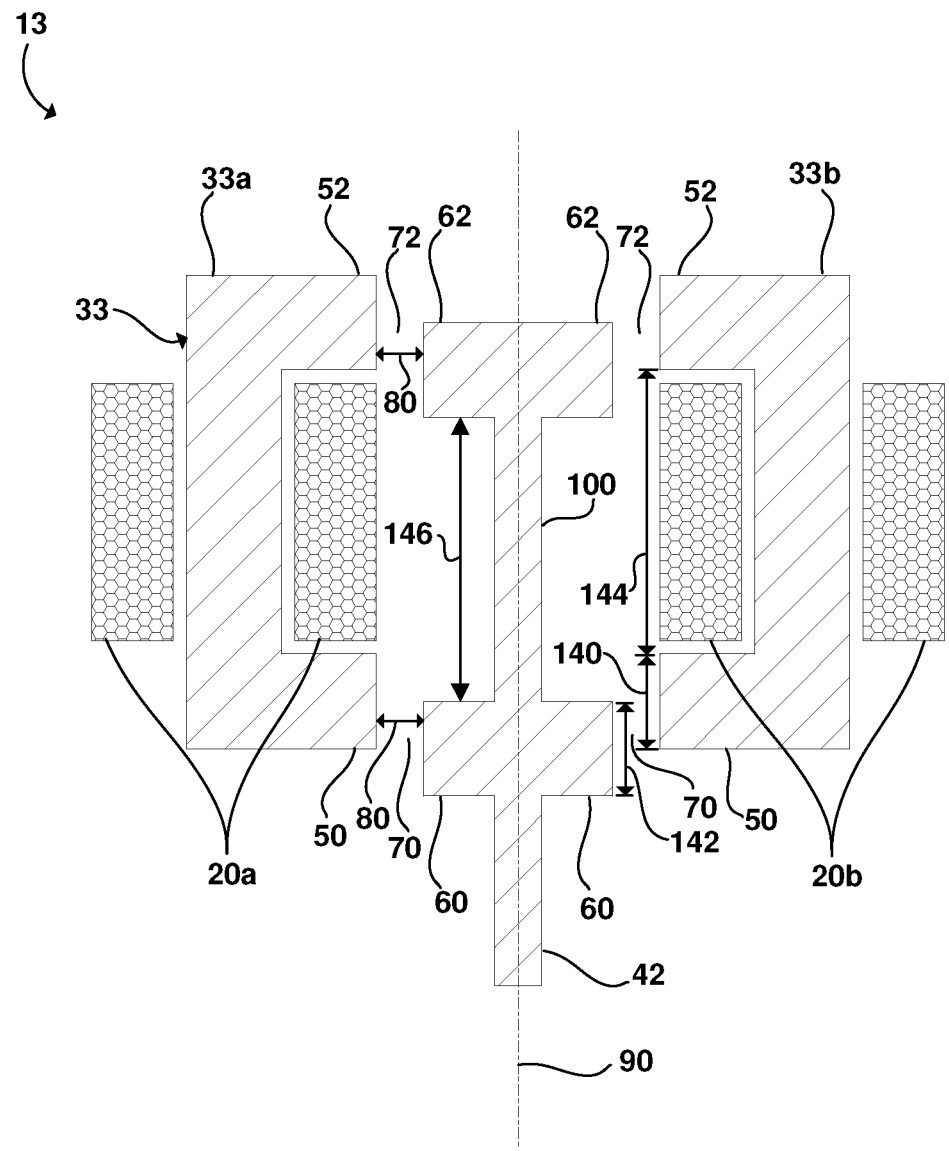
FIG. 3 is a cross-sectional view of a solenoid employing series-stator air-gaps according to another embodiment.

Referring now to FIG. 3, there is shown solenoid 13 according to another embodiment of a constant air-gap solenoid, which is similar to the embodiments of FIGS. 1 and 2, and where the first flux pathway (defined by stator teeth 50, air-gaps 70 and plunger teeth 60) is in series with the second flux pathway (defined by stator teeth 52, air-gaps 72 and plunger teeth 62). Stator 33 is split into two portions, 33a and 33b with respective coils 20a and 20b. Coils 20a and 20b are connected in series and produce a magnetic potential that constructively adds, and therefore coils 20a and 20b can be considered to be equivalent to the single coil 20 illustrated in FIG. 1 and FIG. 2. Alternatively, only one of coils 20a or 20b can be employed. When there is an imbalance between coils 20a and 20b, such as a difference in the winding count, then the joining member 100 is made of non-magnetic material to ensure flux travels through both stator portions 33a and 33b rather than through joining member 100. Air-gaps 70 and 72 when in series cause solenoid 13 to exhibit different force and inductance characteristics when compared to solenoids 10 and 12 shown in FIGS. 1 and 2 respectively.

Figure 4:
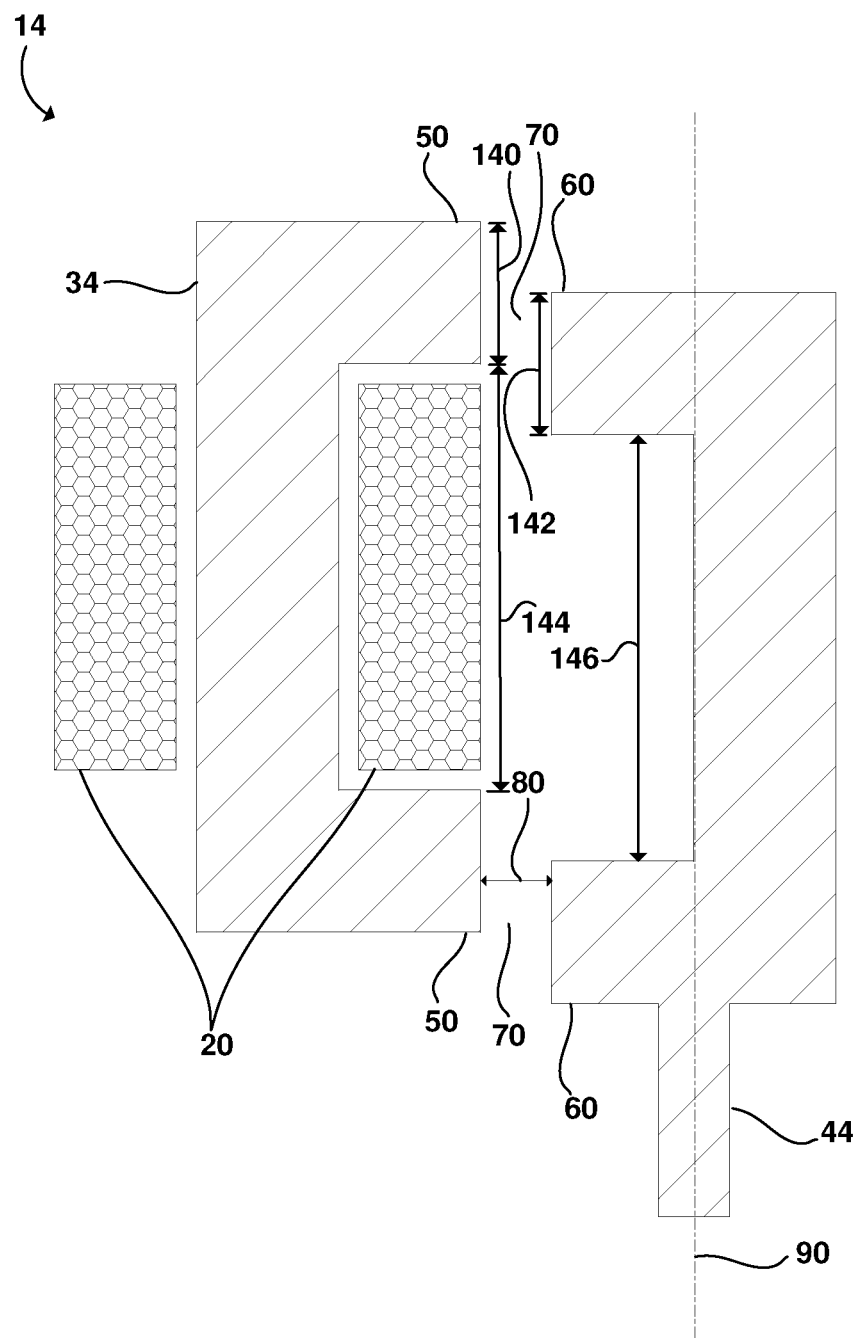
FIG. 4 is a cross-sectional view of a solenoid employing an asymmetric stator according to another embodiment.

Referring now to FIG. 4 there is shown solenoid 14 according to another embodiment of a constant air-gap solenoid where stator 34 is in an asymmetric spatial relationship with plunger 44, in that plunger 44 is not surrounded by stator 34, but rather stator 34 is adjacent to only one side of plunger 44. The geometry of solenoid 14 is more compact than the geometries of solenoids 10, 12 and 13. However, the geometry of solenoid 14 generates a strong magnetic force that acts to pull stator teeth 50 together with plunger teeth 60 (that is, to collapse air-gaps 70). Solenoid 14 is packaged such that plunger 44 or stator 34 movement is constrained to the designated axis 90 of motion whereby length 80 of air-gaps 70 remain preferably constant.

Figure 5:
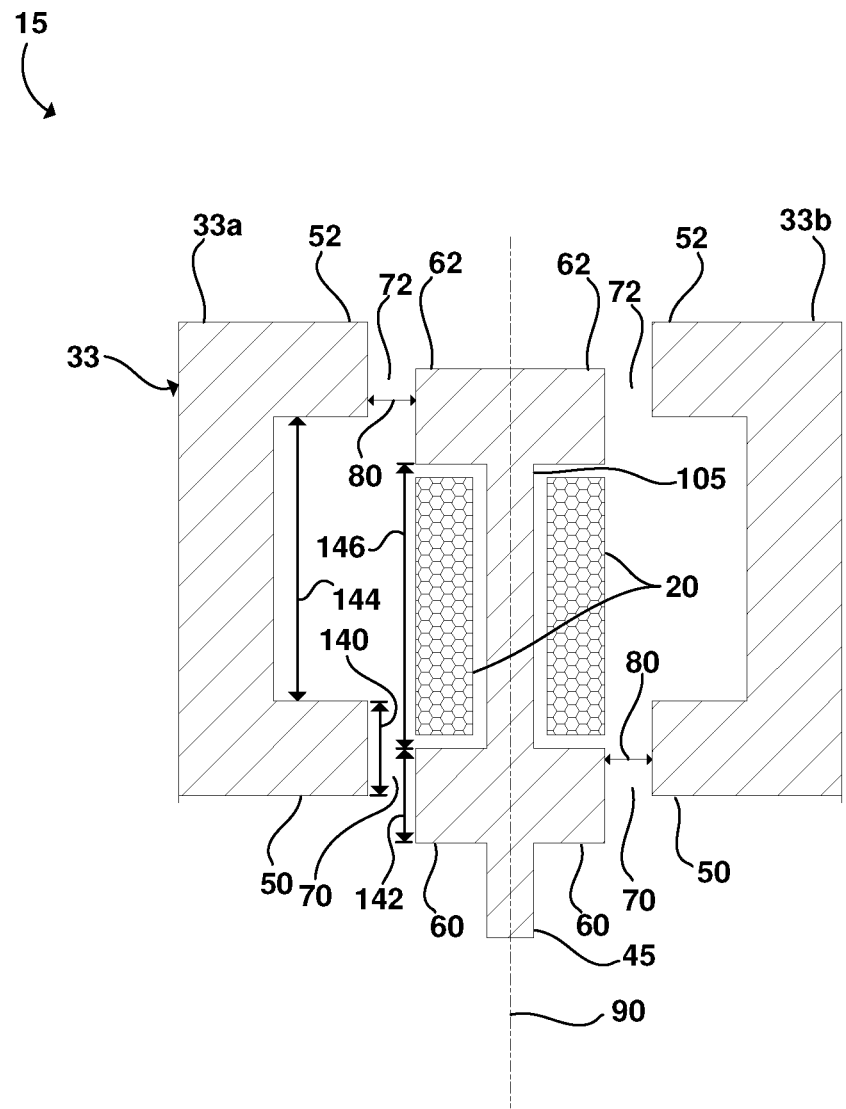
FIG. 5 is a cross-sectional view of a solenoid employing a coil associated with an armature according to another embodiment.

Referring now to FIG. 5 there is shown solenoid 15 according to another embodiment of a constant air-gap solenoid that is similar to solenoid 13 in FIG. 3 except there is a single coil and not a pair of coils, and coil 20 is wrapped around joining member 105 of plunger 45. Accordingly, joining member 105 is made from a ferromagnetic material. When coil 20 is energized, the magnetic flux is channeled through joining member 105 (unlike in solenoids 12 and 13 of FIGS. 2 and 3 respectively) before being split between stator portions 33a and 33b. This embodiment is unique from the previous embodiments in that solenoid 15 can be made into a cuboid shape or a cylindrical shape.

Figure 6:
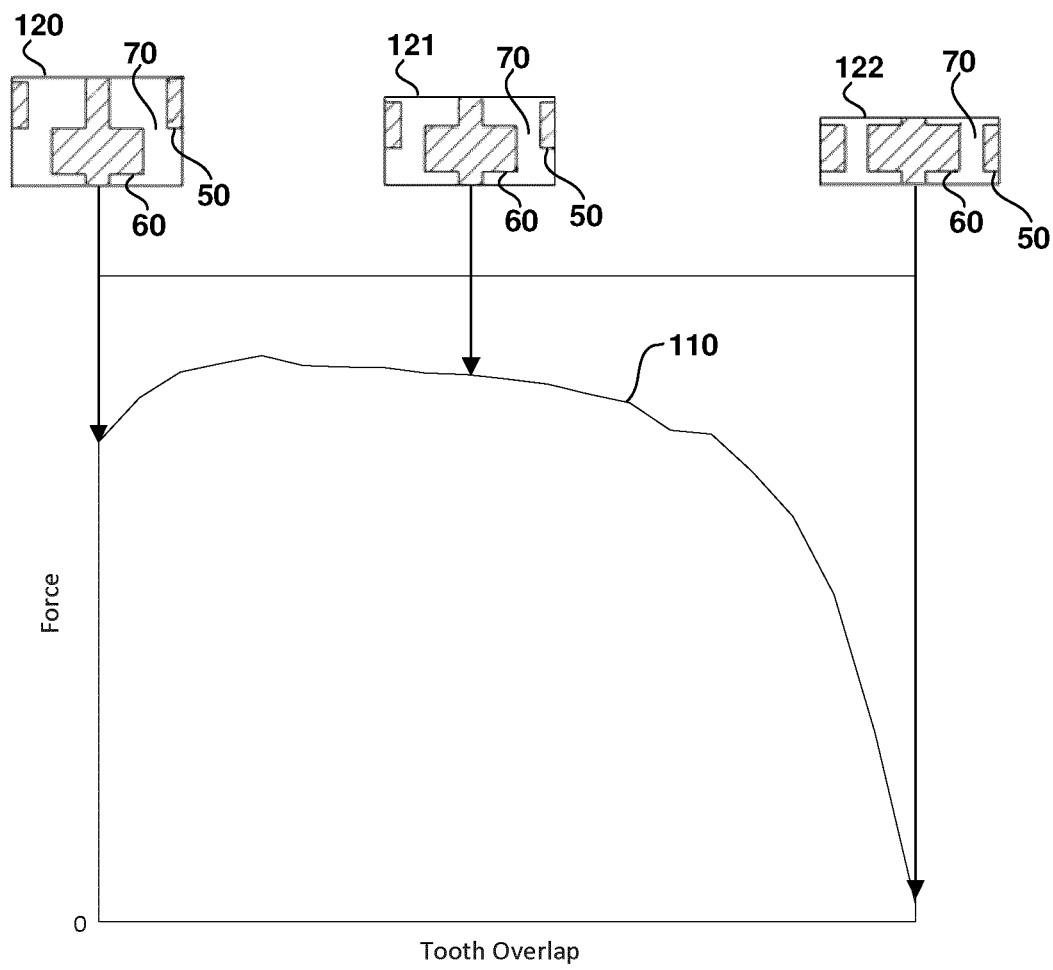
FIG. 6 is a chart view of a force versus stator-plunger tooth overlap characteristic of the solenoid of FIG. 1. The chart illustrates a quasi-constant force the solenoid produces near the middle-region of its total stroke. The force characteristics are shown relative to the amount of overlap between the plunger teeth and the stator teeth.

The operation of solenoids 10, 12, 13, 14 and 15 will now be described in more detail. Reference is made to solenoid 13 (seen in FIG. 3) throughout the following description of operation, and it is understood that the same description applies to the other solenoids 10, 12, 14 and 15, and to other embodiments of constant air-gap solenoids in general. With reference to FIG. 6, solenoid 13 when operated as an actuator exhibits a force versus tooth overlap relationship illustrated by characteristic 110. Position 120 illustrates plunger teeth 60 and stator teeth 50 in a non-overlapped position (or more accurately on a threshold between a non-overlapped and an overlapped position), position 121 illustrates plunger teeth 60 and stator teeth 50 in a half-overlapped position, and position 122 illustrates plunger teeth 60 and stator teeth 50 in a completely overlapped position. Position 120 can also be defined as a minimum amount of overlap between respective plunger teeth 60 and stator teeth 50, and position 122 can also be defined as a maximum amount of overlap between respective plunger teeth 60 and stator teeth 50. When plunger teeth 60 and stator teeth 50 are in the vicinity of being half-overlapped (position 121), an output force of solenoid 13 can be treated as quasi-constant. The output force is defined as the force exerted on either the plunger or the stator when coil 20 is energized. Solenoid 13 when operated as an actuator is operated well-within the conditions of no-tooth-overlap (position 120) and complete-tooth-overlap (position 122) in order to exhibit the constant-force characteristic behavior. The constant-force behavior of solenoid 13 within positions 120 and 122 implies it will produce a BEMF proportional to a velocity of the plunger 42. This phenomenon provides the basis for the BEMF-based position estimation algorithm, which will be described in more detail below.

Figure 7:
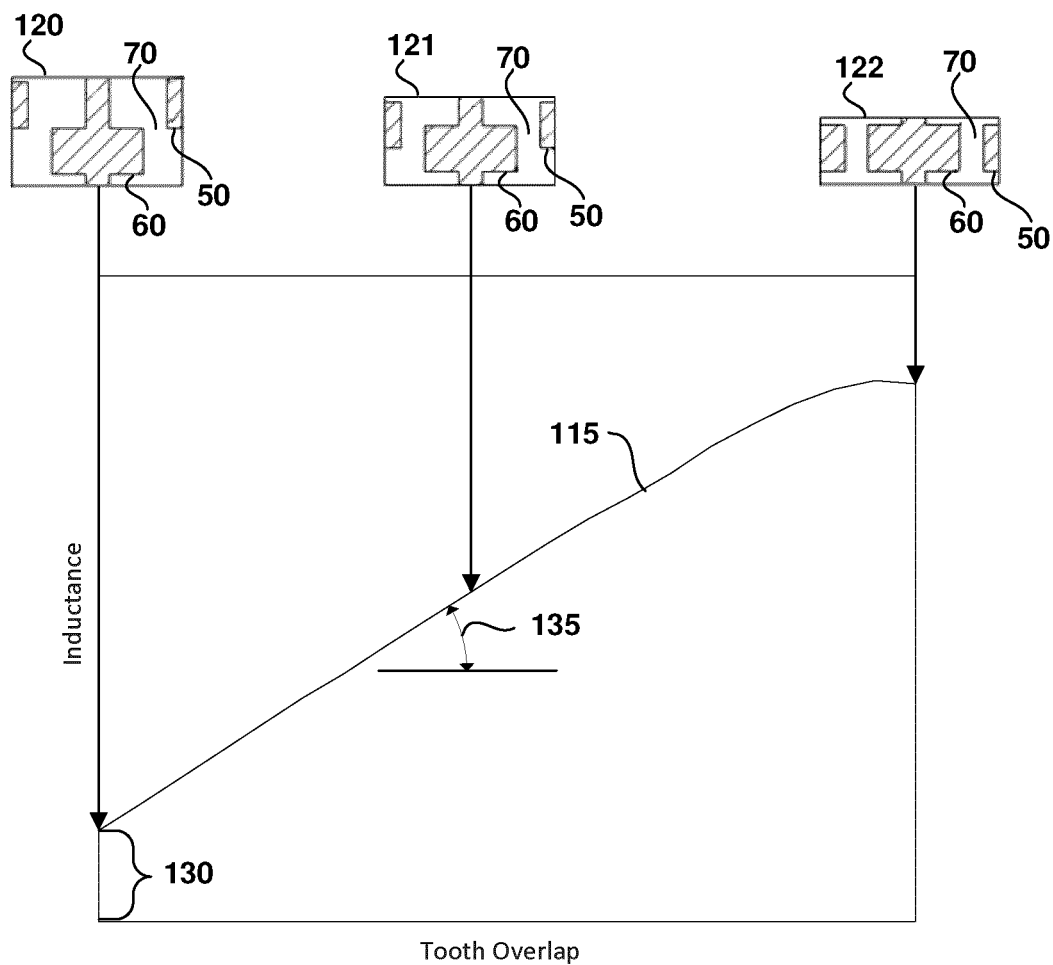
FIG. 7 is a chart view of an inductance versus stator-plunger tooth overlap characteristic of the solenoid of FIG. 1. The chart illustrates a quasi-linear inductance change of the solenoid over its total stroke. The inductance characteristics are shown relative to the amount of overlap between the plunger teeth and the stator teeth.

Solenoid 13 exhibits a proportional change in inductance relative to tooth overlap as illustrated by characteristic 115 in FIG. 7. As long as plunger teeth 60 and stator teeth 50 are less than completely overlapped (position 122) by a first predetermined margin and more than not overlapped (position 120) by a second predetermined margin, solenoid 13 exhibits a linear change in inductance that can be modeled with a first order polynomial within an acceptable margin of error. The first and second predetermined margins can be determined empirically (preferably), or analytically. The linear behavior provides a basis for position estimation algorithms described hereinafter and referred to as the inductance-based algorithm, the flux-linkage-based algorithm and the BEMF-based algorithm. Exemplary embodiments of solenoids 10, 12, 13, 14 and 15 reduce and preferably minimize offset 130 and increase and preferably maximize slope 135 of inductance versus tooth overlap characteristic 115.

Figure 8:
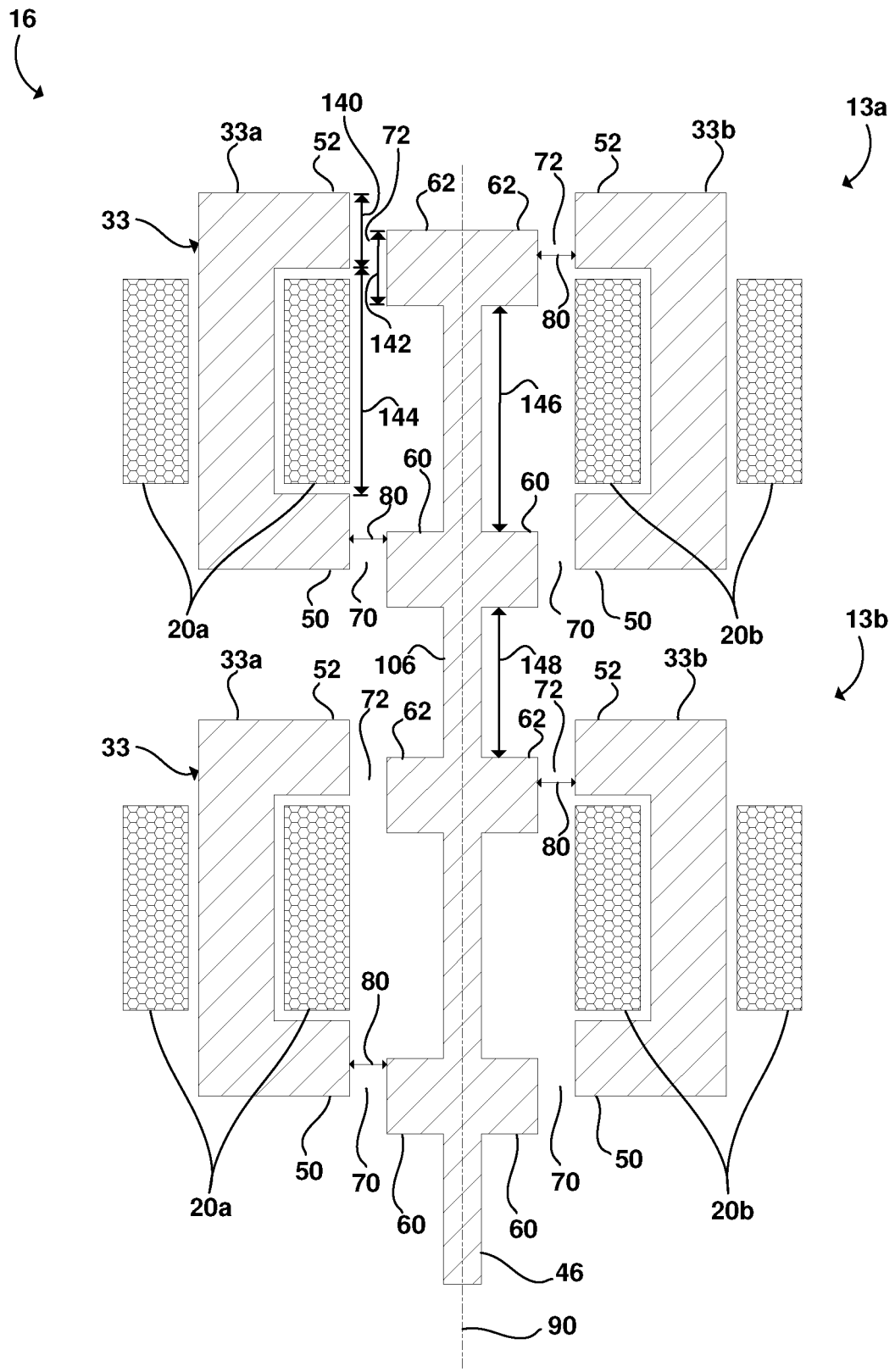
FIG. 8 is a cross-sectional schematic view of a solenoid employing two stacked solenoids in a form of two stators connected through a common plunger and capable of pulling the common plunger in a single direction according to another embodiment.

Referring now to FIG. 8 there is shown solenoid 16 according to another embodiment of a constant air-gap solenoid where two actuators (also referred to as solenoids) similar to solenoid 13 are stacked and connected through common plunger 46. Plunger teeth 60, 62 and stator teeth 50, 52 of first actuator 13a and second actuator 13b are configured such that all plunger teeth 60, 62 experience a force that pulls plunger 46 in the same direction when coils 20a, 20b are energized. Joining member 106 of plunger 46 between first and second actuators 13a and 13b is preferably made of a non-ferromagnetic material such that magnetic flux circulating in first actuator 13a does not interfere or mix with magnetic flux circulating in second actuator 13b, and vice versa. This configuration allows an output force of solenoid 16 to increase with every stacked actuator similar to solenoid 13 that is added. It is important to note that stator portions 33a of first and second actuators 13a and 13b (and similarly for stator portions 33b) can be physically separate as shown, or made from a single piece of magnetic material. Multiple coils 20a, 20b, series stator-plunger air-gaps, parallel stator-plunger air-gaps, or any combination of these can be employed in other embodiments. Solenoid 16 can be stacked with other types of actuators as well, such as voice coils, to give them hybrid performance characteristics.

Figure 9:
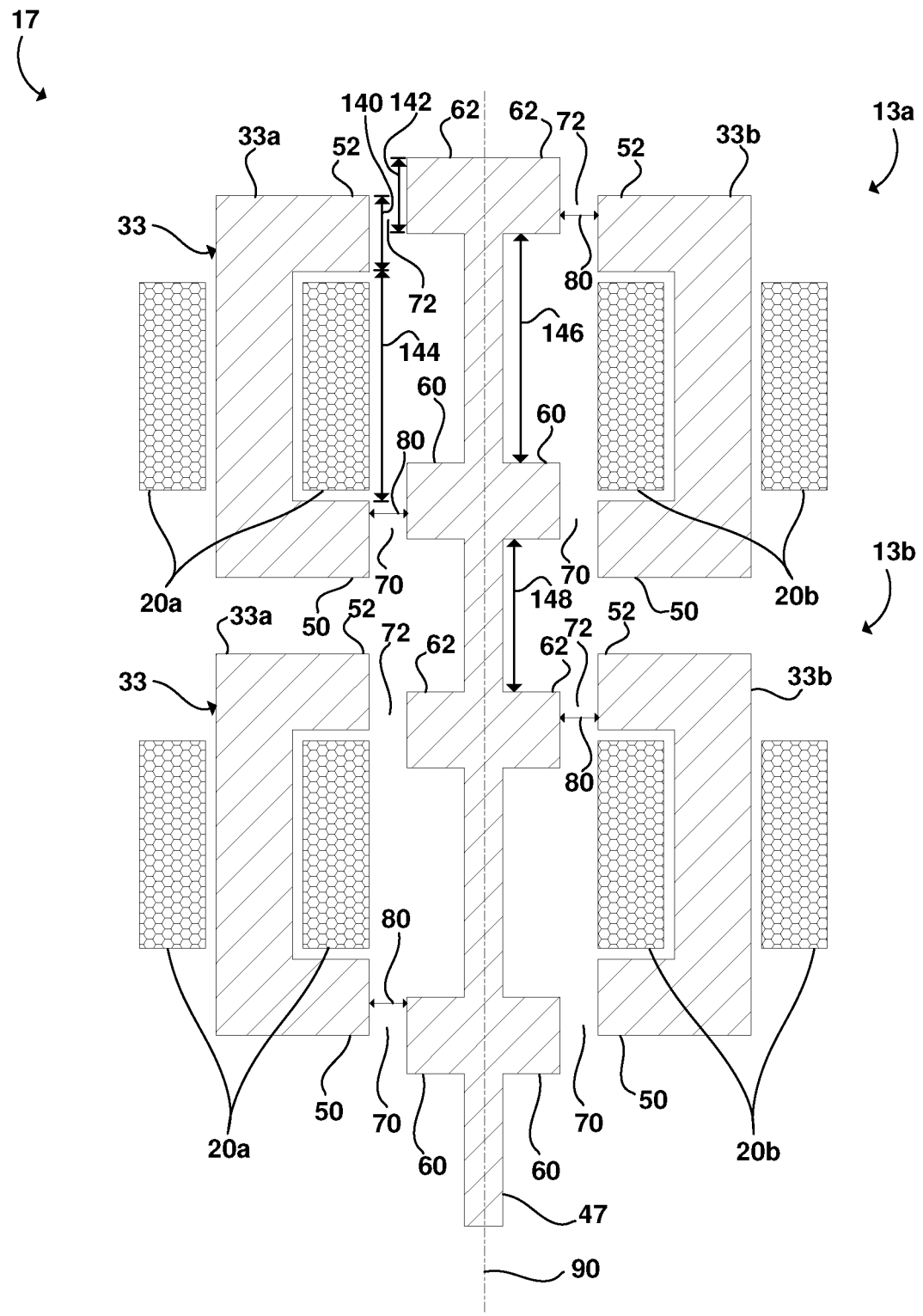
FIG. 9 is a cross-sectional schematic view of a solenoid employing a first actuator stacked with a second actuator in a form of two stators connected through a plunger common to the first and the second actuators according to another embodiment. The solenoid can be employed as a bi-directional actuator where the plunger can be pulled in two directions by selectively actuating individually and separately the first and the second actuators. Alternatively, the solenoid can be employed as a position sensor where the first and the second actuators can be actuated to obtain a differential position measurement without substantially affecting a position of the plunger.

Referring now to FIG. 9 there is shown solenoid 17 according to another embodiment of a constant air-gap solenoid that is similar to solenoid 16 in FIG. 8 but where first actuator 13a exerts a first force on plunger 47 that is opposite a second force exerted by second actuator 13b on plunger 47. That is, the first force pulls plunger 47 in an opposite direction than the second force due to the difference in orientation between plunger teeth 60, 62 and stator teeth 50, 52 of first actuator 13a compared to plunger teeth 60, 62 and stator teeth 50, 52 of second actuator 13b. This orientation of the stator and plunger teeth allows first actuator 13a to be operated independently of second actuator 13b to create a bidirectional actuator that does not require a return mechanism, such as a mechanical spring. A magnitude of the first force relative to a magnitude of the second force depends upon the magnetic flux flowing through the air-gaps of respective actuators 13a and 13b, which in turn depends upon the number of windings in coils 20a and 20b of both actuators 13a and 13b, and the current that is employed to energize coils 20a and 20b of both actuators 13a and 13b.

Solenoid 17 can also be operated as a sensor capable of performing differential position measurements. In the sensor configuration, all coils 20a, 20b of first and second actuators 13a and 13b respectively are wound in series and share an equal number of windings. Accordingly, when a current is supplied to the windings, first actuator 13a and second actuator 13b exert equal forces on plunger 47, but in opposite directions. In the illustrated embodiment, plunger 47 is configured with respect to stators 33 of first and second actuators 13a, 13b such that the plunger feels a compressive electromagnetic force when coils 20a, 20b are energized. In other embodiments plunger 47 can be configured with respect to stators 33 of first and second actuators 13a, 13b such that the plunger feels a tensile electromagnetic force when coils 20a, 20b are energized. With reference to FIG. 9, it is seen that as plunger 47 moves downwards, first actuator 13a experiences increased overlap of its plunger teeth 60, 62 and stator teeth 50, 52 while second actuator 13b experiences a proportional decrease in overlap of its plunger teeth 60, 62 and stator teeth 50, 52. The inverse relationship of the overlapping teeth provides the basis to perform differential measurements using information from the two conjoined first and second actuators 13a and 13b. Furthermore, since information can be independently supplied from each of first and second actuators 13a and 13b, solenoid 17 when operated as a differential position sensor has inherent sensor redundancy that is well suited for critical-operation applications, such as, but not limited to throttle position sensors. Solenoid 17 is also magnetically self-shielding since stators 33 of actuators 13a and 13b inherently channel magnetic flux through a defined path (unlike an LVDT or DVRT).

Solenoids 10, 12, 13, 14, 15, 16 and 17 illustrated in FIGS. 1-5, 8 and 9 respectively are exemplary embodiments where stator tooth width 140 and plunger tooth width 142 are equivalent. Plunger and stator tooth widths can be different in other embodiments. With reference to FIG. 2 (and similarly for other embodiments), distance 144 between stator teeth 50 and 52 is larger than plunger tooth width 142 to maintain advantageous characteristics (for example, near constant force and near proportional inductance). Exemplary embodiments increase distance 144 between stator teeth 50 and 52 by an additional two times length 80 of air-gaps 70 to reduce the likelihood that magnetic flux fringes to adjacent plunger teeth 62 and 60 respectively. Similarly, distance 146 between plunger teeth 60 and 62 is larger than stator tooth width 140. In exemplary embodiments distance 146 between plunger teeth 60 and 62 is increased by an additional two times length 80 of air-gaps 70 to reduce the likelihood that magnetic flux fringes to adjacent stator teeth 52 and 50 respectively. With reference to solenoid 16 in FIG. 8, distance 148 between plunger teeth 60 and 62 of first and second actuators 13a and 13b respectively is at least equal to plunger tooth width 142. In exemplary embodiments distance 148 is increased by an additional two times length 80 of air-gaps 70 to reduce the likelihood that magnetic flux fringes between first and second actuators 13a and 13b. With reference to solenoid 17 in FIG. 9, distance 148 between plunger teeth 60 and 62 of first and second actuators 13a and 13b respectively is at least two times plunger tooth width 142. In exemplary embodiments distance 148 is at least three times plunger tooth width 142 to reduce the likelihood of mutual coupling due to magnetic fringing between first and second actuators 13a and 13b.

Figure 10A:
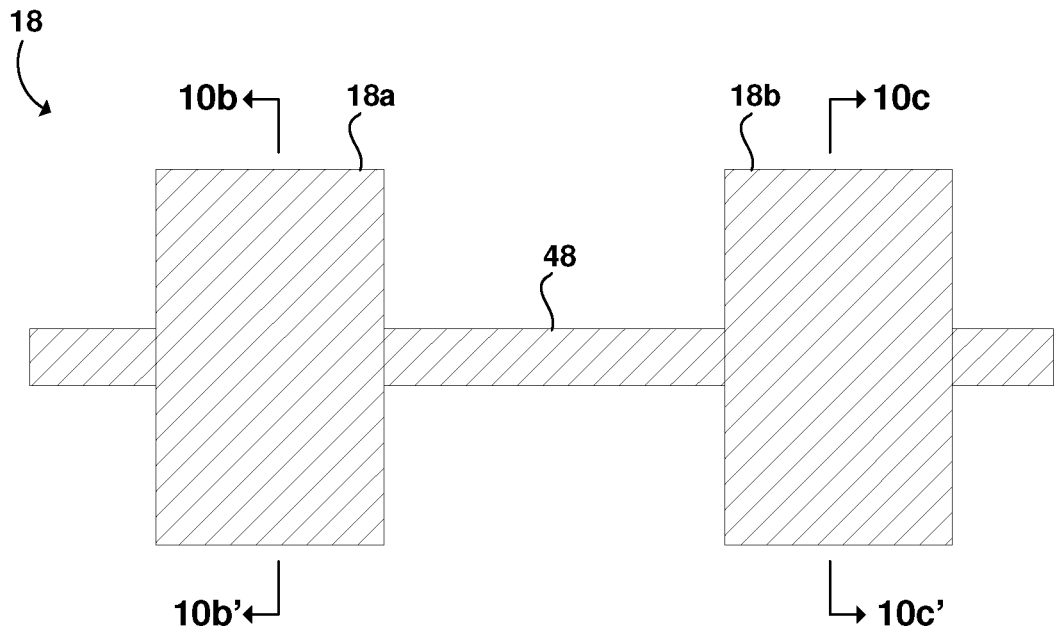
FIG. 10a is a side elevational view of a solenoid including a first rotary actuator and a second rotary actuator connected through a rotor common to the first and the second rotary actuators according to another embodiment. The solenoid can be employed as a bi-directional rotary actuator where the rotor can be rotated in two directions by selectively actuating individually and separately the first and second solenoids. Alternatively, the solenoid can be employed as a position sensor where the first and second rotary actuators can be actuated to obtain a differential position measurement without substantially affecting a position of the rotor.
Figure 10B:
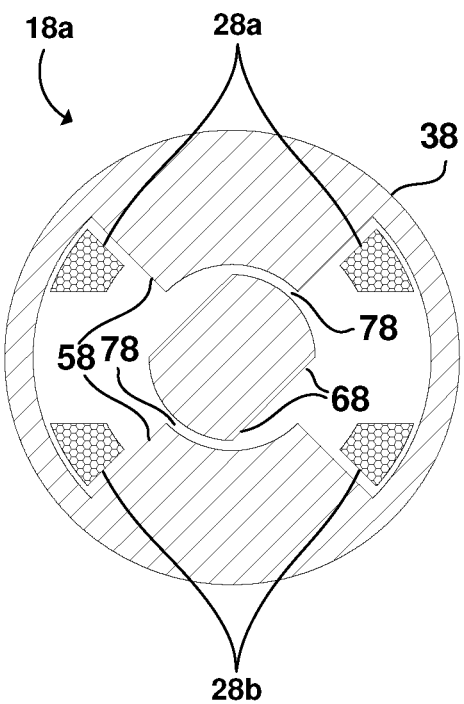
FIG. 10b is a cross-sectional view of the first rotary actuator of the solenoid of FIG. 10a taken along line 10b-10b'.
Figure 10C:
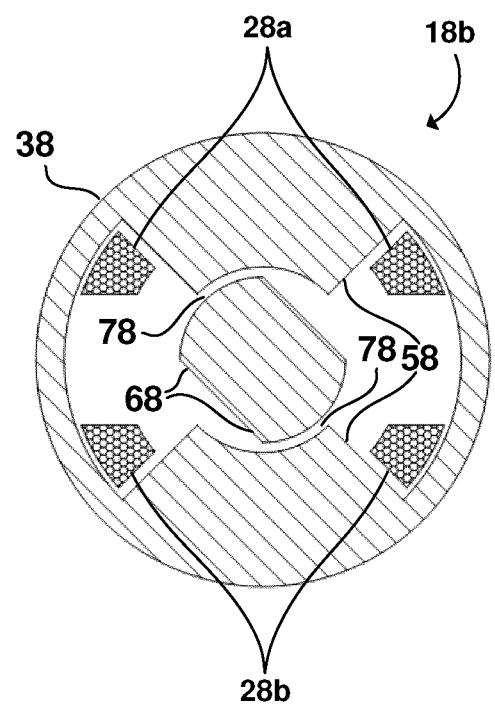
FIG. 10c is a cross-sectional view of the second rotary actuator of the solenoid of FIG. 10a taken along line 10c-10c'.

Referring now to FIG. 10, there is shown solenoid 18 according to another embodiment of a constant air-gap solenoid in a form of a rotary solenoid. Solenoid 18 includes first rotary actuator 18a and second rotary actuator 18b connected with common rotor 48. Each first and second rotary actuator 18a and 18b includes stator 38 having stator teeth 58 extending radially inwardly, rotor teeth 68 connected to and extending radially outwardly from common rotor 48, and coils 28a and 28b. Air-gaps 78 extend between stator teeth 58 and respective rotor teeth 68. First rotary actuator 18a is configured to create counter-clockwise rotation when its respective coils 28a and 28b are energized. Second rotary actuator 18b is configured to create clockwise rotation when its respective coils 28a and 28b are energized. Note that in other embodiments each first and second actuator 18a and 18b can employ only one of coils 28a and 28b. Rotor 48 allows bidirectional rotation for solenoid 18 without a need for an external return-mechanism, such as a torsion spring. Rotor 48 operates over a region where stator teeth 58 and rotor teeth 68 of each first and second rotary actuators 18a and 18b are overlapped. In other embodiments there can be additional rotor teeth added to rotor 48 that correspond to additional stator teeth added to stator 38. An external transmission (not shown) can be added to solenoid 18 in other embodiments to enable large rotary displacements. In other embodiments coils 28a and 28b can extend into each other around an inner circumference of stator 38 whereby they become a single coil with continuous, electrically connected windings, in manner where the single coil does not interfere with rotor 48 and rotor teeth 68.

Solenoid 18 is also capable of being operated as a sensor capable of performing differential position measurements. In this configuration coils 28a and 28b of both first and second rotary actuators 18a and 18b are wound in series with each other, and where each pair of coils 28a and 28b of both the first and second rotary actuators share an equal number of windings. Accordingly, when a current is supplied to the windings of the pairs of coils 28a and 28b, first rotary actuator 18a and second actuator 18b exert equal torques on common rotor 48 but in opposite directions. These opposing torques produce a net torque of zero on common rotor 48. Solenoid 18 when operated as a differential position sensor has similar abilities as solenoid 17 (shown in FIG. 9) when operated as a differential position sensor, except solenoid 18 is used to measure rotary displacements rather than linear displacements.

Figures 11A, 11B, 11C:
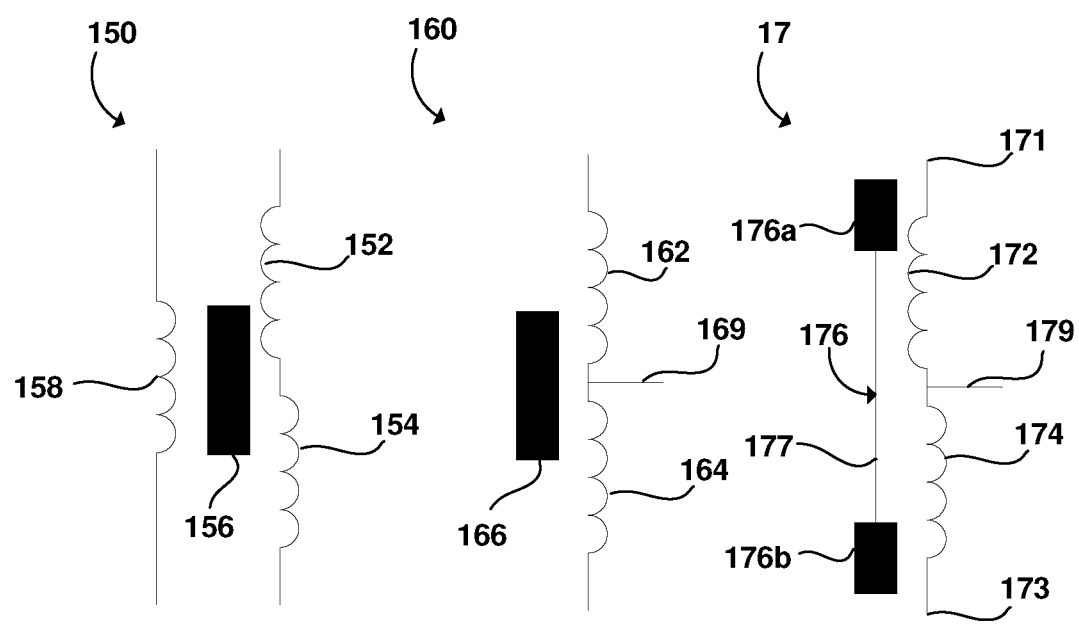
FIG. 11a is a schematic view of a linear variable differential transformer of the prior art.
FIG. 11b is a schematic view of a differential variable reluctance transducer of the prior art.
FIG. 11c is a schematic view representative of the solenoids of FIGS. 9, 10 and 16. In contrast to the LVDT and DVRT of FIGS. 11a and 11b respectively, the solenoid employs a split-core design that allows for unique position estimation algorithms that are unique to the solenoids of FIGS. 9, 10 and 16.

Referring now to FIGS. 11a, 11b and 11c there are shown schematic views illustrating winding and core configurations of LVDT 150 (prior art), DVRT 160 (prior art) and solenoid 17 (configured as a position displacement sensor). LVDT 150 includes upper windings 152, lower windings 154, core 156 and primary windings 158. DVRT includes upper windings 162, lower windings 164, core 166 and center tap 169. Solenoid 17 includes upper windings 172, lower windings 174, split-core 176 having cores 176a and 176b, and center tap 179. Upper windings 172 of solenoid 17 are equivalent to coils 20a and 20b in first actuator 13a, and lower windings 174 are equivalent to coils 20a and 20b in second actuator 13b (seen in FIG. 9). Cores 176a and 176b are equivalent to plunger teeth 60 and 62 of first and second actuators 13a and 13b respectively. Unlike LVDT 150, solenoid 17 does not require a primary winding. Furthermore, solenoid 17 can have its upper windings 172 wound in the same direction as its lower windings 174, similar to DVRT 160, or more preferably wound in an opposite direction of its lower windings 174, similar to LVDT 150. A key difference between solenoid 17 and either LVDT 150 or DVRT 160, is that cores 176a and 176b of solenoid 17 are separated by linkage 177 that does not affect the mutual-inductance coupling between upper winding 172 and lower winding 174. Split-core 176 is unique compared to single-cores 156 and 166 employed in LVDT 150 and DVRT 160 respectively. Split-core 176 enables a bias current to be passed through windings 172 and 174 without creating a net force or damping on the split-core and this is not possible with LVDT 150 and DVRT 160. In order to retain zero net force on split-core 176, solenoid 17 is not used in a configuration as half of a Wheatstone bridge as is often done with DVRT 160. The ability to add bias current without consequence enables the flux-linkage-based algorithm and the BEMF-based algorithm for position estimation and is unique to solenoid 17. Center tap 179 can be used in solenoid 17 similar to center tap 169 in DVRT 160 to obtain voltage measurements of upper windings 172 and lower windings 174 for these position estimation algorithms.

Figure 12:
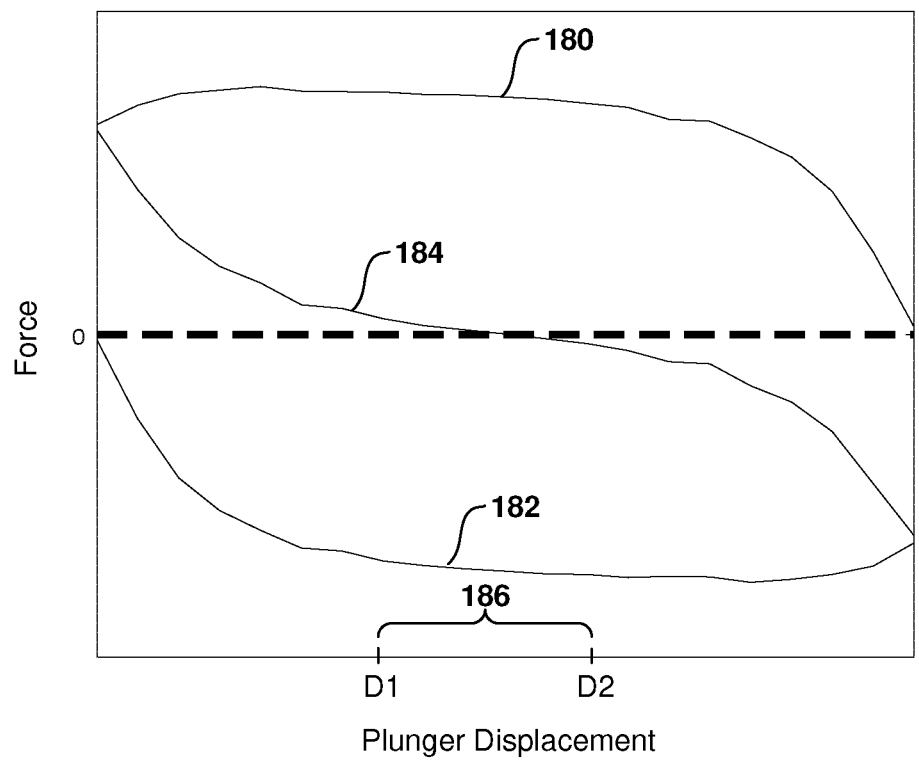
FIG. 12 is a chart view of force versus plunger displacement characteristics of the first and second actuators of FIG. 9 and a net force versus plunger displacement characteristic when the solenoid of FIG. 9 is employed as the position sensor. The chart view illustrates that the net force on the plunger of the position sensor is negligible when the first and second actuators are substantially overlapped. A similar chart exists for the solenoids of FIGS. 10 and 16.

Referring now to FIG. 12 there is shown force versus plunger displacement characteristics 180, 182 and 184 representative of solenoid 17 configured and operated as a differential position sensor (seen in FIG. 9) over a stroke of plunger 47. Characteristic 180 represents a force versus plunger displacement curve for first actuator 13a (seen in FIG. 9), characteristic 182 represents a force versus plunger displacement curve for second actuator 13b, and characteristic 184 represents a net force versus plunger displacement curve for solenoid 17. Characteristic 184 is a sum of characteristics 180 and 182. In the illustrated embodiment of FIG. 12, a positive-pulling force of characteristic 180 is quasi-constant (that is, near constant within a third predetermined margin) over a partial stroke of plunger 47 in region 186 defined as between plunger displacements D1 and D2. Similarly, a negative-pulling force of characteristic 182 is quasi-constant (that is, near constant within a fourth predetermined margin) over the partial stroke of plunger 47 in region 186. Region 186 is approximately a mid-region of characteristics 180 and 182. It is important to note that characteristics 180 and 182 are obtained by actuating first and second actuators 13a and 13b independently and separately of each other (that is, one at a time). In region 186, the positive-pulling force is substantially equal to the negative-pulling force but opposite in direction. A sum of the positive-pulling force and the negative-pulling force, represented as characteristic 184, is nearly zero to within a fifth predetermined margin over region 186. As a consequence, this entails solenoid 17 produces negligible net force on plunger 47 when first and second actuators 13a and 13b (seen in FIG. 9) are actuated simultaneously, which is preferable for a dedicated position sensor. This also entails that solenoid 17 does not add any substantial damping, and preferably none, to a system that it is sensing.

Figure 13:
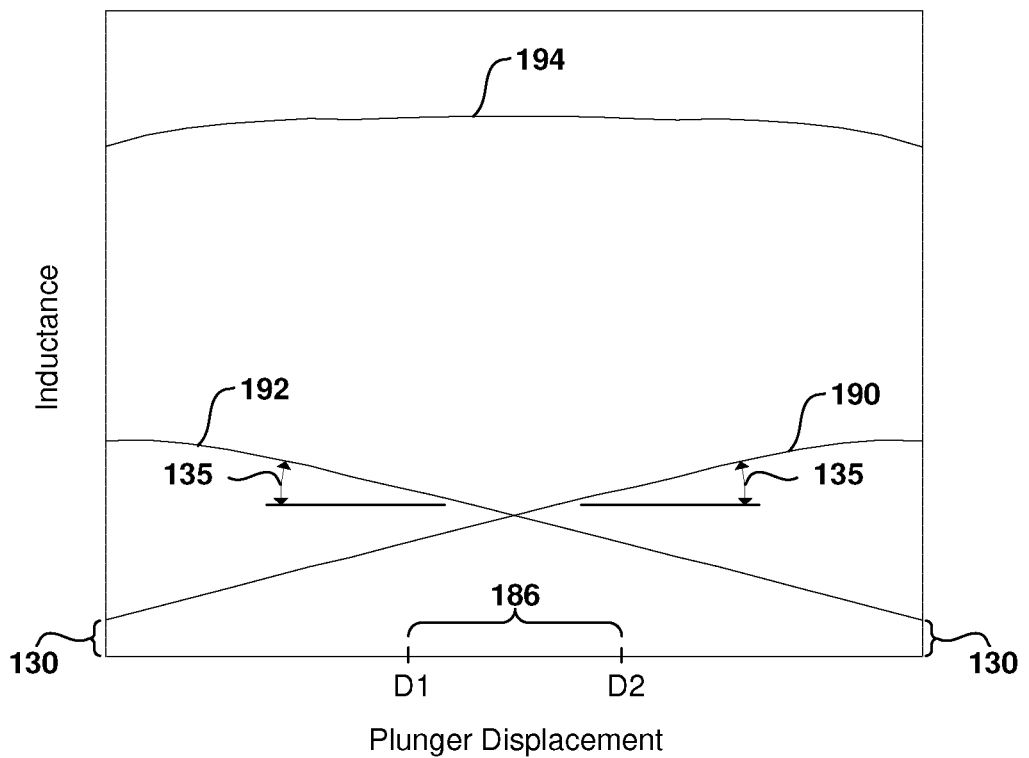
FIG. 13 is a chart view of inductance versus plunger displacement characteristics of the first and second actuators of FIG. 9 and a net inductance versus plunger displacement characteristic when the solenoid of FIG. 9 is employed as the position sensor. The chart view illustrates the inductance of first and second actuators varying inversely as the plunger is displaced, and that the net inductance of the position sensor is approximately constant. A similar chart exists for the solenoids of FIGS. 10 and 16.

With reference to FIG. 13, there is shown inductance versus plunger displacement characteristics 190, 192 and 194 representative of solenoid 17 (seen in FIG. 9) over a stroke of plunger 47. Characteristic 190 represents an inductance versus plunger displacement curve for first actuator 13a (seen in FIG. 9), characteristic 192 represents an inductance versus plunger displacement curve for second actuator 13b, and characteristic 194 represents a net inductance versus plunger displacement curve for solenoid 17. Characteristic 194 is a sum of characteristics 190 and 192. In the illustrated embodiment of FIG. 13, a positively-pulling inductance of characteristic 190 increases proportionally with plunger displacement and is substantially linear within region 186, and a negative-pulling inductance of characteristic 192 decreases proportionally with plunger displacement and is also substantially linear within region 186. This inverse-relationship between characteristics 190 and 192 can be utilized within a differential measurement to estimate the position of plunger 47. With reference to FIG. 13, the summed inductance of characteristic 194 from the positive and negative pulling inductances is approximately constant to within a sixth predetermined margin within region 186. The summed inductance of characteristic 194 corresponds to a terminal inductance that is measured between terminals 171 and 173 across upper windings 172 and lower windings 174 (in series with each other) seen in FIG. 11c. The positive-pulling inductance of characteristic 190 corresponds to an inductance measured from terminal 171 to center tap 179 as shown in FIG. 11c, and the negative-pulling inductance of characteristic 192 corresponds to an inductance measured from terminal 173 to center tap 179. In exemplary embodiments characteristics 190 and 192 for first and second actuators 13a and 13b respectively reduces and preferably minimizes offset 130, and increases and preferably maximizes slope 135. Although characteristics 190 and 192 are illustrated to have identical offsets 130 and slopes 135, in other embodiments their respective offsets and slopes can vary although it is preferred that they are equal.

Referring back to FIG. 3, a maximum stroke length of plunger 42 in solenoid 13 (and similarly for the other embodiments herein) is determined by the lesser of stator tooth width 140 and plunger tooth width 142. With reference to FIGS. 6 and 7, it is evident that nonlinear effects accumulate near the no-tooth-overlap of position 120 and the complete-tooth-overlap of position 122. An exemplary embodiment further constrains plunger 42 (seen in FIG. 3) and the plungers in other embodiments herein to only operate through a maximum of 60% of its maximum stroke length. This additional constraint allows solenoid 13 and the other solenoids herein to have a quasi-constant force and a linear change in inductance over its constrained stroke.

Figure 14:
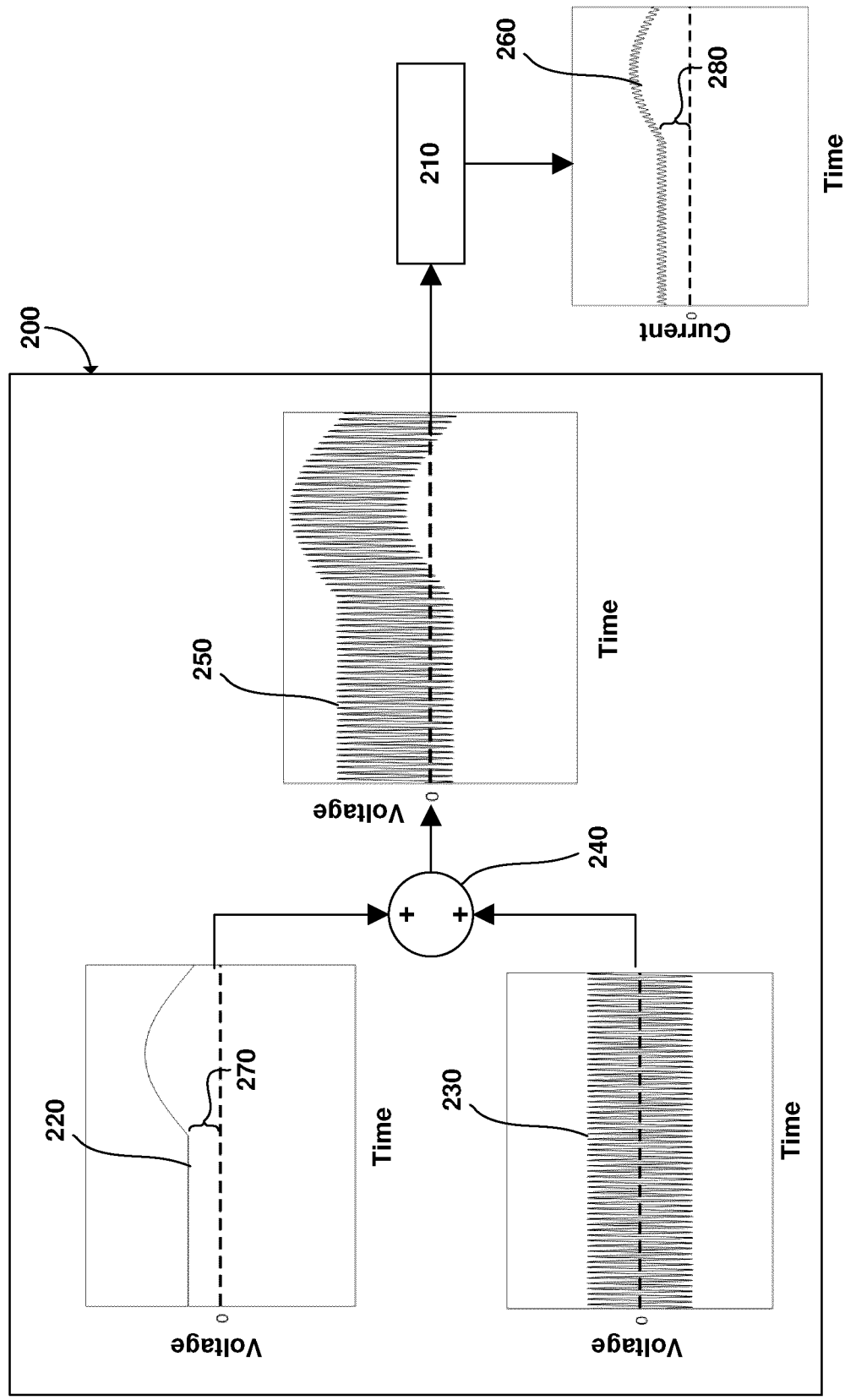
FIG. 14 is a schematic and chart view of output characteristics of a driver employed to operate the solenoid of FIGS. 1, 2, 3, 4, 5, 8, 9, 10a, and 16 as an actuator and a sensor simultaneously. The driver superimposes a ripple signal on a primary control signal (also known as a bias signal) to produce a current characteristic employed to operate the solenoid.

Referring now to FIG. 14 there is shown driver 200 employed to actuate solenoid 210 that can be anyone of solenoids 10, 12, 13, 14, 15, 16, 17, 18 and 19 disclosed herein, as well as other embodiments of constant air-gap solenoids. Driver 200 is an electronic signal driver that can include analog and/or digital components and/or circuitry. For example, driver 200 can include an electronic controller, such as a microcontroller, programmed with software to generate digital signal waveforms and having digital-to-analog converters to convert these digital signal waveforms to analog signal waveforms. When solenoid 210 is employed as an actuator to move a plunger or rotor it can also be employed to simultaneously sense the position of the plunger or rotor. This can be referred to as single-mode operation. Alternatively, when solenoid 210 is configured to operate as a differential position sensor it does not significantly affect (and preferably not all) the position of the plunger or rotor. This can be referred to as differential-mode operation. Driver 200 can be employed with solenoid 210 for both single-mode operation and differential-mode operation. Driver 200 generates primary control signal 220 and ripple signal 230 and superimposes signals 220 and 230 with adder 240 to create output signal 250. Output signal 250 is applied to solenoid 210 inducing current signal 260 to flow through the coils of the solenoid. When solenoid 210 is configured for differential-mode operation (such as in solenoids 17, 18 and 19 seen in FIGS. 9, 10 and 16 respectively), primary control signal 220 is purely a DC voltage and does not have any AC voltage components. Primary control signal 220 includes continuous voltage bias 270 to avoid division-by-zero errors within position estimation algorithms. Continuous voltage bias 270 results in a continuous current bias 280 in current signal 260. An amplitude of continuous bias 270 is selected to meet slow-speed measurement requirements of the flux linkage-based or BEMF-based algorithms (described in more detail below), minimize power usage, and ensure zero-crossings never occur in current signal 260. Techniques to create ripple signal 230 include a separate function generation circuit or a superimposing filter network, and in other embodiments can employ other techniques such as linear amplifiers or harnessing the inherent voltage ripple produced by switch-mode power electronic circuits (for example, as with H-bridges). A frequency of ripple signal 230 is set high-enough to ensure aliasing does not occur with primary control signal 220 or with any BEMF that is generated. When solenoid 210 is configured for single-mode operation (such as in solenoids 10, 12, 13, 14, 15 and 16 seen in FIGS. 1-5, 8 respectively), the frequency of ripple signal 230 is set high enough to ensure it is sufficiently larger than a mechanical resonant frequency of solenoid 210. An amplitude of ripple signal 230 is selected based on signal-to-noise ratio requirements of the inductance-based algorithm (described in more detail below) and power usage.

Figure 15:
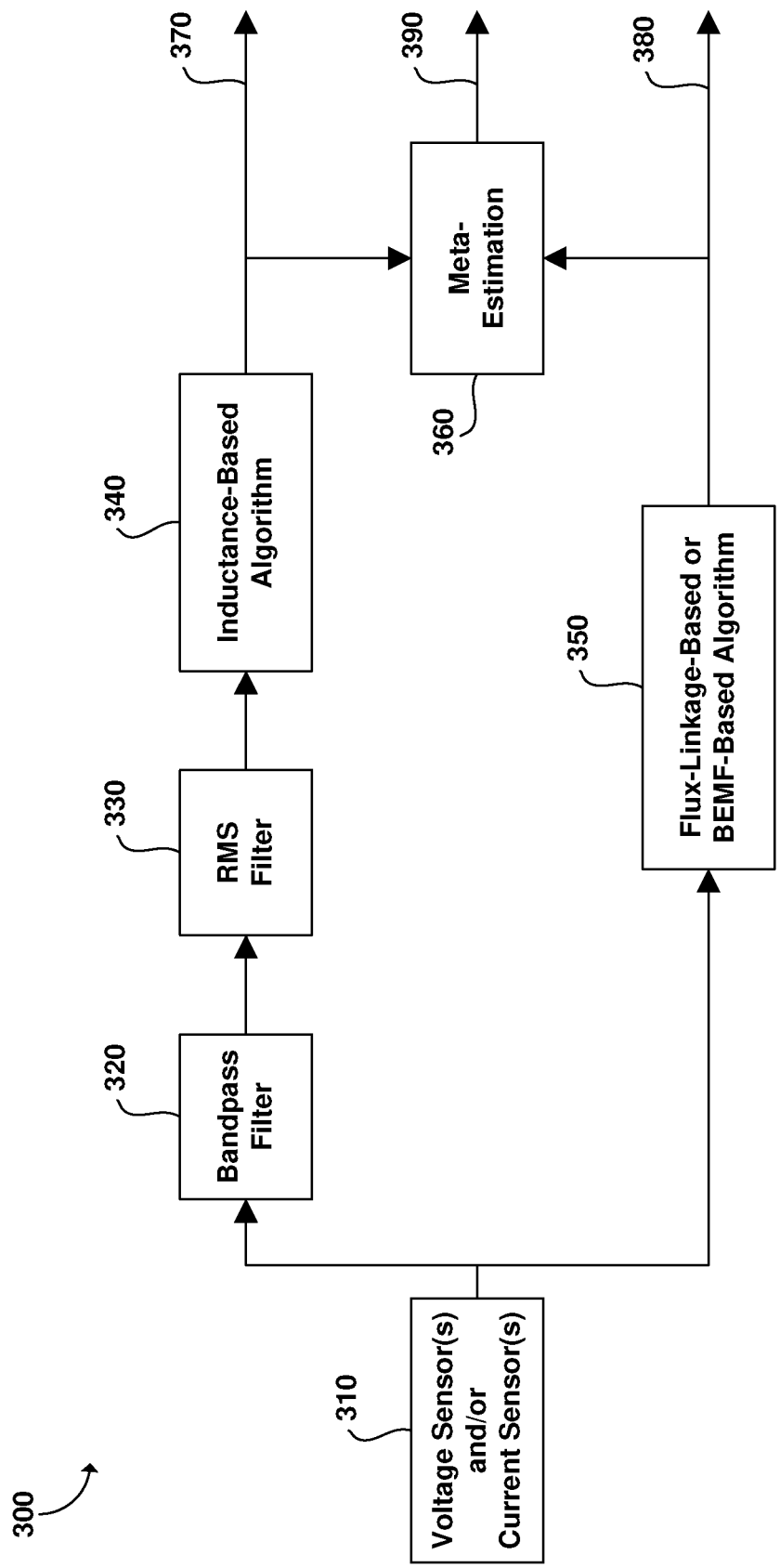
FIG. 15 is a flow chart of position estimation algorithms including an inductance-based algorithm and a flux-linkage-based or a BEMF based algorithm. Standalone estimates from the inductance-based algorithm and the flux-linkage-based or BEMF-based algorithms can be employed independently and separately or can be combined with a meta-estimation algorithm, also known as a sensor fusion technique.

Referring now to FIG. 15 there is shown position estimation algorithm 300 that includes inductance-based algorithm 340 and flux-linkage-based or BEMF-based algorithm 350 for detecting plunger or rotor position of solenoids 10, 12, 13, 14, 15, 16, 17 and 18 embodiments disclosed herein. Algorithm 300 is preferably carried out by driver 200, in which circumstance driver 200 includes the electronic controller that can be programmed with algorithm 300. Alternatively algorithm 300 can be carried out by another computer processor. Algorithms 340 and 350 can be executed simultaneously, independently and separately from each other, or one but not the other can be executed. Each algorithm 340 and 350 has as inputs voltage and current measurements from voltage and current sensors in step 310. For solenoids configured for single-mode operation, terminal voltage across all coils and the series current through all of the coils is measured. For solenoids configured for differential-mode operation two voltage sensors that measure the voltage across upper windings 172 and lower windings 174 (seen in FIG. 11c) are recommended as well as one current sensor that measures the series current flowing through both windings 172 and 174. Measuring the winding voltages and currents in this way provides good linearity and allows independent measurements from each actuator within the solenoid. These independent measurements can then be used to perform redundant checks to determine if the sensor is operating properly, or if it is damaged. One of the three sensors can be removed when reduced linearity and internal sensor redundancy is permitted in an application using the premise of constant terminal inductance illustrated by characteristic 194 shown in FIG. 13. When electrical parameters of the coils are characterized, then one can use a terminal voltage measurement to calculate the series current or vice versa. When the voltage of center tap 179 (seen in FIG. 11c) is measured, it becomes possible to infer the voltage and current characteristics of each actuator within the solenoid.

Referring again to FIG. 15 it is illustrated that after taking voltage and current measurements in step 310, algorithm 300 diverges into two parallel paths in the subsequent steps for inductance-based algorithm 340 and flux-linkage-based or BEMF-based algorithm 350. For inductance-based algorithm 340, the measured voltage of output signal 250 and the measured current of current signal 260 (both seen in FIG. 14) are filtered with a bandpass filter in step 320 in order to isolate the measured components corresponding to a voltage of ripple signal 230 and a current of a current ripple signal induced in the solenoid therefrom, referred to herein as the measured voltage ripple signal and the measured current ripple signal. Depending on the application and surrounding hardware, the bandpass filter in step 320 has its quality factor tuned accordingly, or is made into a higher-order filter. This filtering can be done digitally or using analog circuitry. Next, the measured voltage ripple signal and the measured current ripple signal are passed through an RMS filter in step 330 that calculates root mean square (RMS) values of these signals, referred to as the RMS voltage and the RMS current herein. The RMS filter in step 330 can be an analog circuit or a digital program. The RMS voltage and the RMS current are then input into inductance-based algorithm 340.

Inductance-based algorithm 340 determines an impedance of the solenoid by applying Ohm's Law to the RMS voltage and the RMS current. A resistance portion of the impedance can then be found through periodic measurements, assumed to be constant or assumed to be negligible depending on the operating circumstances. An inductance portion of the impedance can then be found by utilizing the orthogonal nature of resistance and inductance. Inductance-based algorithm 340 can be summarized by the Equation 1 below where y is plunger position, $U_{rms_{filtered}}$ is the RMS voltage, $I_{rms_{filtered}}$ is the RMS current, R is the winding resistance, f is the specified ripple frequency, $C_1$ is a constant that accounts for the geometric and material parameters of the solenoid and $C_2$ is a constant that compensates for the minimum inductance of the solenoid. To determine $C_1$ and $C_2$, first the inductance of the solenoid is measured (for example, using inductance-based algorithm 340) over the intended plunger stroke. This measurement produces the graph shape seen in FIG. 7. Next, a linear regression is fit over the intended stroke range. $C_1$ is the slope of the regression. $C_2$ is a function of the y-intercept of the regression and $C_1$.

$$y = \frac{\sqrt{\left(\frac{U_{rms_{filtered}}}{I_{rms_{filtered}}}\right)^2 - R^2}}{2\pi f C_1} - C_2 \qquad \text{Equation 1}$$

In an exemplary embodiment $C_1$ is empirically measured as slope 135 of the inductance vs. tooth overlap characteristic 115 illustrated in FIG. 7, and $C_2$ is found by linearizing the first order relationship that can be created using $C_1$. Alternatively, $C_1$ can also be determined through analytic modeling or FEA analysis. The resistance of the solenoid can be either neglected when the ripple frequency is large, assumed constant or measured using Ohm's law when the plunger or rotor is stationary. The CAS sensor can also find the resistance by using analog or digital low pass filters to isolate the DC bias signal and using Ohm's law on a continual basis. An output of inductance-based algorithm 340 can be used as standalone estimate 370; alternatively, or additionally, standalone estimate 370 can be forwarded to meta-estimation algorithm 360, also referred to as a sensor fusion technique, as will be described in more detail below.

It is important to note that inductance-based algorithm 340 is well-suited for measuring slow-speed plunger movements. Like other previously published and patented methods that use an AC ripple to identify inductance, at high-speeds, the estimate is prone to phase-lag error. Standalone estimate 370 is well-suited for acquiring absolute position with slow transient movements. When inductance-based standalone estimate 370 is employed to estimate high-velocity movements, phase error can occur and possibly aliasing. A larger driving frequency can be employed to compensate. However, an exemplary embodiment is to use information from flux linkage-based or BEMF-based algorithms 350 instead, as will be described in more detail below.

When employing a BEMF-based method, algorithm 350 uses the BEMF generated by the moving plunger. Unlike prior art, where a ripple signal was required, the proposed algorithm does not have this requirement and can operate based on voltage and current measurements of output signal 250 (seen in FIG. 14) with or without the superimposed ripple signal 230. Direct measurements from the voltage and current sensors 310 as shown in FIG. 15 are taken. The direct measurements are then applied to Equation 2 below. Based on Faraday's and Ohm's laws, the BEMF-based method of algorithm 350 can be formulated in Equation 2 where U is a raw voltage measurement, I is a raw current measurement and $\dot{I}$ is the derivative of the current measurement.

$$y_n = \int \frac{U - RI - C_1(y_{n-1} + C_2)\dot{I}}{C_1 I} \qquad \text{Equation 2}$$

It is important to note that Equation 2 requires an integral to obtain a relative position estimate. Therefore, this algorithm is prone to an accumulation of error due to drift. Over long-duration measurements, the accumulated error would become substantial, however, over short-duration measurements the accumulated error would be small. Furthermore, at high-velocities, the measurement has a better signal-to-noise ratio. Therefore, this measurement is well suited for measuring high-speed plunger displacements. Lastly, it is important to note that current signal 260 must never cross zero in order for the algorithm to remain stable. This imposes a constraint that primary control signal 220 has a voltage bias 270 that is large enough to produce current bias 280 that is always greater than zero.

When examining inductance-based algorithm 340 and the BEMF-based method of algorithm 350, it can be seen that they complement each other as the position estimate from inductance-based algorithm 340 is well-suited for low-speed measurements and the position estimate from BEMF-based algorithm 350 is well-suited for high-speed measurements. Furthermore, since both algorithms can be run simultaneously, it is possible to combine the measurements using meta-estimation algorithm 360, such as a complementary filter. Meta-estimation algorithm 360 combines the measurements and allows for one wide-bandwidth, low-noise measurement that would far exceed the capabilities of the individual algorithms. Meta-estimation algorithm 360 is described in more detail below.

When meta-estimation algorithm 360 is employed, the BEMF-based method in algorithm 350 can be replaced with a more robust flux-linkage-based method. The flux-linkage-based method in algorithm 350 is simply a reformulation of the BEMF-based algorithm, however, its real-world implementation results in different performance. The flux linkage-based method in algorithm 350 is formulated according to Equation 3 as follows:

$$\frac{d(LI)}{dt} = \frac{\int U - RI}{I}$$ Equation 3

Standalone estimate 380 of flux-linkage-based algorithm 350 can be used to directly infer relative plunger displacement using Equation 4 as follows:

$$y = \frac{\int U - RI}{IC_1} - C_2$$ Equation 4

However, it is important to note that initializing the integral of Equation 4 (in the flux-linkage-based method of algorithm 350) is more challenging than initializing the integral of Equation 2 (in the BEMF-based method of algorithm 350). Therefore, as a standalone measurement, BEMF-based algorithm 350 is likely preferable. However, when meta-estimation algorithm 360 is employed, the initialization of the integral is no longer of importance and therefore the flux linkage-based measurement is superior as it does not introduce a timestep delay or require the numerical derivative of the measured current, which is prone to amplifying sensor noise.

An output of flux-linkage-based or BEMF-based algorithm 350 can be used as standalone estimate 380; alternatively, or additionally standalone estimate can be passed to meta-estimation algorithm 360 as illustrated in FIG. 15. Standalone estimate 380 is preferably applied in circumstances requiring a high-velocity estimate and relative position. At low-speeds, the integrals accumulate error and cause the position estimate to drift. The error could be reset on a periodic basis, but an exemplary embodiment would make use of meta-estimation algorithm 360 to compensate for the drift. As a standalone measurement, the BEMF-based method of algorithm 350 is preferable over the flux-linkage-based method of algorithm 350 since its integral is easier to initialize. However, the flux linkage-based method of algorithm 350 is preferable when used with meta-estimation algorithm 360 since it does not require prior position knowledge, and does not require a derivative to be calculated from the current.

FIG. 15 illustrates that both algorithms 340 and 350 can be simultaneously combined into single estimate 390 using meta-estimation algorithm 360. Meta-estimation algorithm 360 can include a complementary filter or Kalman filter. With proper tuning, estimate 390, which is considered a wideband estimate, will be free from drift and phase-lag errors. Only aliasing and high-order magnetic effects would limit the upper bandwidth of the measurement. In nearly all circumstances, it would be advantageous to use estimate 390 of the meta-estimation algorithm 360 rather than standalone estimates 370 and 380. The term $$\frac{d(LI)}{dt}$$

from Equation 3 can be used directly as a high-speed input for meta-estimation algorithm 360. The output of meta-estimation algorithm 360 can then be divided by current and translated to a position estimate based on the inductance-position relationship.

It is important to note that various combinations of previously published algorithms can be employed to estimate position for the solenoids disclosed herein in place of or in addition to algorithms 340 and 350. In order to increase the usefulness of the solenoid, position estimation algorithms whose ideal bandwidth ranges complement each other are employed, such as the flux linkage-based and inductance-based algorithms. It is also preferable to ensure the algorithms are compatible so that independent simultaneous measurements can be produced and combined with meta-estimation algorithm 360.

The simplistic design of constant air-gap solenoids allows them to be easily stacked into a large structure while moving a common plunger. This stacking can occur internally within a stator where additional teeth and coils are added to the design. The stacking can also occur by adding independent stators with one common plunger spanning all of the stators. In its most basic form where all of the stators pull in a single direction, the output force can be proportionally increased with each added stage. Series winding all of the stators together allows the aforementioned algorithms to be applied without any modifications since the overall structure can be treated as a single CAS. However, one can also series wind two stators together but align them such that they pull the plunger in opposite directions. This configuration allows for bidirectional plunger movement without a return mechanism. In this case, each solenoid would require its own voltage sensor and current sensor. However, in this pull-pull configuration, if the coils are driven with a series current, then a very robust position sensor results.

The CAS sensor works by having two identical CAS actuators pull against each other for a supplied current. Since they are identical, both actuators will produce an equal, but opposite force. This is important since an ideal sensor does not exert a force on the system it is measuring. Furthermore, it is important to note that in this configuration, as the stator-plunger overlap of one CAS increases, the other stage will experience a decrease in stator-plunger overlap. This implies that each CAS works inversely and therefore a differential measurement of plunger position according to Equation 5 can be employed where S is the total stroke length of the plunger (for example, plunger 47 seen in FIG. 9), $y_1$ is the position estimate of one actuator (for example, first actuator 13*a* seen in FIG. 9), and $y_2$ is the position estimate of another actuator (for example, second actuator 13*b* seen in FIG. 9):

$$y_{diff} = \frac{y_1 + S - y_2}{2} \quad \text{Equation 5}$$

It is important to note that inputs $y_1$ and $y_2$ to Equation 5 can either be standalone estimates 370 and 380 from inductance-based algorithm 340 and flux-linkage-based or BEMF-based algorithm 350 respectively, or meta-estimate 390 from meta-estimation algorithm 360. The differential measurement drastically improves the signal-to-noise ratio of the position estimate since the measurement gains immunity to temperature and current sensor noise. The differential measurement can be performed with two voltage sensors and one current sensor, or it can be performed with either two voltage sensors or one voltage sensor and one current sensor. In the three-sensor configuration, each CAS can be independently monitored, allowing for internal sensor redundancy which is important for critical-operation sensors. In the two-sensor configuration, internal redundancy is lost as well some linearity, however, implementation cost is reduced as the missing measurement can be calculated from the remaining two sensors.

Any of estimate 370, 380 and 390 in FIG. 15 can be used by a CAS actuator for position feedback in a controller loop. This would allow the CAS actuator to maintain a desired plunger position or move along a predefined trajectory without requiring a dedicated position sensor. While this concept is possible among other actuator types, a CAS actuator has the novel ability to accomplish this task without lookup tables while fusing two simultaneous internal estimates.

For a CAS sensor, algorithm 300 illustrated in FIG. 15 is applied to upper windings 172 and lower windings 174 in solenoid 17 seen in FIG. 11*c*. The outputs from algorithm 300 can then be combined into differential measurements using Equation 5 above. A key advantage of the differential measurement is common-mode disturbance rejection. The common-mode disturbance rejection enables the algorithms to become virtually independent of resistance over their linear region provided the three-sensor method is employed. By removing the resistive dependence, the CAS gains a large degree of temperature immunity. Furthermore, common-mode material changes due to factors, such as temperature, would also be rejected.

It is important to note that the inductance-based algorithm 340 for a CAS sensor could be replaced by other DVRT voltage-only algorithms that have been previously published. A DVRT algorithm could then be combined with the novel flux-linkage-based or BEMF-based algorithm 350 through meta-estimation algorithm 360. However, it is important to note the reverse is not possible since the DVRTs do not use current sensors, nor would they be able to integrate the flux-linkage-based or BEMF-based algorithm 350 since a bias current would create a net force on core 166 of DVRT 160 seen in FIG. 11*b*. The CAS sensor is capable of estimating position over a much wider bandwidth than an LVDT or DVRT, due to unique abilities enabled through the addition of a bias current.

Figure 16:
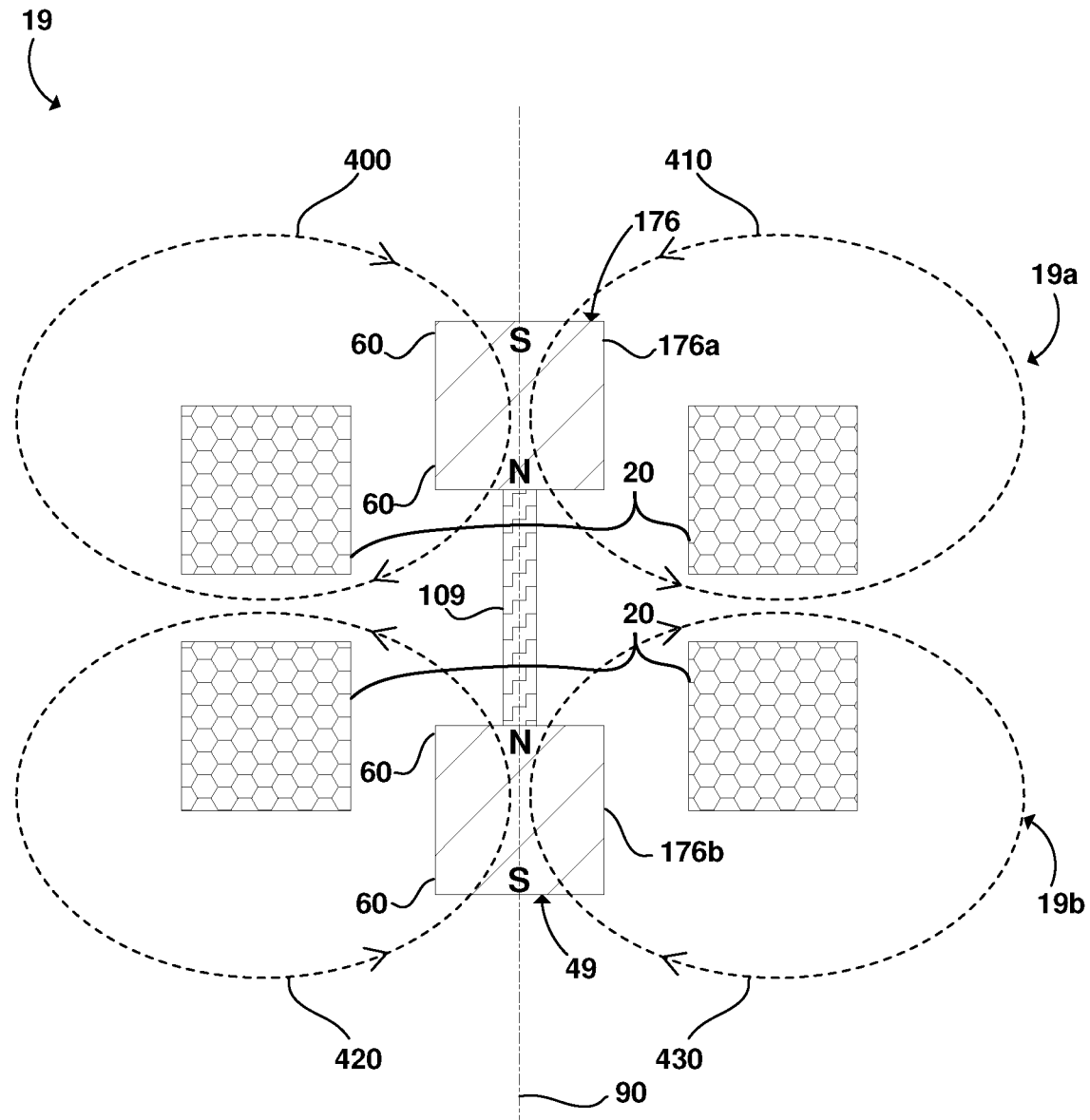
FIG. 16 is a schematic view of a position sensor employing a split-core plunger and a coreless electromagnet in the form of a coil for each core of the split-core plunger. Each electromagnet is configured without a ferromagnetic-core to channel magnetic flux. Each core of the split-core plunger overlaps its respective coil throughout its entire stroke.

Referring now to FIG. 16 there is shown solenoid 19 according to another embodiment of a constant air-gap solenoid that does not employ a ferromagnetic stator to guide magnetic flux. Solenoid 19 includes first actuator 19*a* and second actuator 19*b* and having common plunger 49. Plunger 49 corresponds to split-core 176 seen in FIG. 11*c*. First actuator 19*a* includes core 176*a* and respective coil 20 and second actuator 19*b* includes core 176*b* and respective coil 20. Cores 176*a* and 176*b* are connected by joining member 109 that is made from a non-ferromagnetic material. Each core 176*a* and 176*b* includes effective plunger teeth 60 that correspond to north and south poles of the cores. Magnetic flux lines 400 and 410 are representative of how flux flows through core 176*a* when coil 20 is energized in actuator 19*a*, and it is understood that there are many more such flux lines. Magnetic flux lines 420 and 430 are representative of how flux flows through core 176*b* when coil 20 is energized in actuator 19*b*, and it is understood that there are many more such flux lines. In the illustrated embodiment when coils 20 are energized north poles of cores 176*a* and 176*b* face each other such that flux lines 400 and 410 are repelled by flux lines 420 and 430 (that is, magnetic flux generated by coil 20 of actuator 19*a* push against magnetic flux generated by coil 20 of actuator 19*b*) thereby creating the flux loops shown. In other embodiments when coils 20 are energized south poles of cores 176*a* and 176*b* face each other such that flux lines 400 and 410 are also repelled by flux lines 420 and 430, but where the magnetic flux flows along flux lines 400, 410, 420 and 430 in opposite directions respectively than as illustrated in FIG. 16. In still further embodiments the north pole of core 176*a* can face the south pole of core 176*b*, or the south pole of core 176*a* can face the north pole of core 176*b*; in both of these embodiments the magnetic flux generated by coils 20 of actuators 19*a* and 19*b* add constructively such that common flux lines would flow through both cores 176*a* and 176*b* and coils 20. Instead of an air-gap between a ferromagnetic-stator and plunger/rotor (like air-gaps 70, 72, 78 selectively found in solenoids 10, 11, 12, 13, 14, 15, 16, 17 and 18 according to the disclosure above), there is a first air-gap between the north pole and the south pole of core 176*a*, and a second air-gap between the north pole and the south pole of core 176*b*. A length of magnetic flux lines 400 and 420 (or 410 and 420) represents a length of a mean flux pathway for all the flux lines of actuators 19*a* and 19*b* respectively. Coils 20 of first and second actuators 19*a* and 19*b* extend around axis 90 and are spaced longitudinally apart along axis 90, and are fixed in position such that they do not move relative to plunger 49. Coil 20 from actuator 19*a* corresponds to upper windings 172 and coil 20 from actuator 19*b* corresponds to lower windings 174. The lack of a ferromagnetic stator to guide magnetic flux produced by windings 172 and 174 is a similar trait to LVDT 150 and DVRT 160 illustrated in FIGS. 11*a* and 11*b* respectively. However, solenoid 19 still includes split-core 176 and therefore continues to produce force characteristics 180, 182 and 184 seen in FIG. 12 and inductance characteristics 190, 192 and 194 seen in FIG. 13. The lack of a ferromagnetic stator guiding magnetic flux generated when coils 20 are energized allows solenoid 19 to be much more compact than, for example, solenoid 17 seen in FIG. 9 when configured to operate as a differential position sensor. However, the lack of a guided magnetic flux path provided by a ferromagnetic stator increases the variation in net force in region 186 of characteristic 184 (seen in FIG. 12) and reduces the linearity of both the positive-pulling inductance of characteristic 190 and the negative-pulling inductance of characteristic 192 (seen in FIG. 13). The lack of a ferromagnetic stator also removes the magnetically self-shielding properties that the geometries of solenoids 10, 12, 13, 14, 15, 16, 17 and 18 seen in FIGS. 1-5, 8-10 respectively exhibit. However, additional external magnetic shielding can encompass the geometry of solenoid 19 in FIG. 16 to protect it from adverse effects caused by stray magnetic fields or close-proximity ferromagnetic materials.

A mutual inductance of solenoid 19 is non-negligible unlike the flux-decoupled geometry of solenoid 17 seen in FIG. 9. Similar to DVRT 160 seen in FIG. 11b, solenoid 19 has a quasi-constant mutual inductance over its stroke. However, unlike DVRT 160, solenoid 19 can maintain linear inductance characteristics if the windings of coil 20 of actuator 19a and coil 20 of actuator 19b are wound in the same direction so that the magnetic flux adds or in the reverse direction so that the magnetic flux subtracts. An exemplary embodiment has the windings wound in opposite directions so that the mutual inductance subtracts from the positive-pulling inductance and negative-pulling inductance. This reduces the inductance offset 130 (seen in FIG. 13) while leaving the inductance slope 135, unaffected and therefore improves the sensitivity of the inductance-based algorithm 340 (seen in FIG. 15).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A solenoid comprising:
a stator comprising a first stator tooth and a second stator tooth;
an armature comprising a first armature tooth and a second armature tooth, the armature moveable with respect to the stator over a predetermined stroke;
a coil associated with at least one of the stator and the armature for conducting an electric current and generating magnetic flux that is guided by the stator and the armature, at least one of the stator and the armature acting as a ferromagnetic core for the coil;
a first air-gap between the first stator tooth and the first armature tooth and having a first length;
a second air-gap between the second stator tooth and the second armature tooth and having a second length;
wherein the first and second lengths are constant to within a predetermined margin over the predetermined stroke when the first and second armature teeth overlap the first and second stator teeth respectively.

2. The solenoid as claimed in claim 1, wherein the armature moves linearly along an axis.

3. The solenoid as claimed in claim 1, wherein the first length and the second length are equal to within the predetermined margin.

4. The solenoid as claimed in claim 1, wherein the stator surrounds the armature.

5. The solenoid as claimed in claim 1, wherein the stator is adjacent to only one side of the armature.

6. The solenoid as claimed in claim 1, wherein the stator comprises a cuboid shape or a cylindrical shape.

7. The solenoid as claimed in claim 1, further comprising an armature guide associated with the armature for guiding the armature along a longitudinal axis to within a predetermined tolerance.

8. The solenoid as claimed in claim 1, wherein each of the first and second stator teeth include a stator-tooth face and each of the first and second armature teeth include an armature-tooth face, wherein each of the first and second armature teeth overlaps the first and second stator teeth respectively when any perpendicular projection emanating from the armature-tooth face intersects the respective stator-tooth face.

9. The solenoid as claimed in claim 1, wherein widths of the first and second stator teeth are equal to widths of the first and second armature teeth respectively.

10. The solenoid as claimed in claim 1, wherein a first position of the armature is defined as a minimum amount of overlap between the first and second stator teeth and the first and second armature teeth respectively and a second position of the armature is defined as a maximum amount of overlap between the first and second stator teeth and the first and second armature teeth respectively, wherein the predetermined stroke is within the first position and the second position.

11. The solenoid as claimed in claim 10, wherein a force of the solenoid is constant to within a first predetermined tolerance over the predetermined stroke; and
an inductance of the solenoid is linearly proportional to an amount of overlap between the first and second stator teeth and the first and second armature teeth respectively to within a second predetermined tolerance over the predetermined stroke.

12. The solenoid as claimed in claim 10, wherein an amount of overlap between the first and second stator teeth and the first and second armature teeth respectively is linearly proportional to a position of the armature over the predetermined stroke.

13. The claim as claimed in claim 1, further comprising:
a third stator tooth and a fourth stator tooth associated with the stator;
a third armature tooth and a fourth armature tooth associated with the armature;
a third air-gap between the third stator tooth and the third armature tooth and having a third length;
a fourth air-gap between the fourth stator tooth and the fourth armature tooth and having a fourth length;
wherein the third and fourth lengths are constant to within the predetermined margin over the predetermined stroke when the third and fourth armature teeth overlap the third and fourth stator teeth respectively.

14. The solenoid as claimed in claim 13, wherein a distance between the first stator tooth and the third stator tooth is greater than at least one of a width of the first armature tooth and a width of the third armature tooth.

15. The solenoid as claimed in claim 13, wherein a distance between the first armature tooth and the third armature tooth is greater than at least one of a width of the first stator tooth and a width of the third stator tooth.

16. The solenoid as claimed in claim 13, wherein the armature further comprises a joining member connecting the first and second armature teeth to the third and fourth armature teeth.

17. The solenoid as claimed in claim 16, wherein the joining member is made from a non-ferromagnetic material.

18. The solenoid as claimed in claim 13, further comprising:
a first flux pathway including the first and second air-gaps; and
a second flux pathway including the third and fourth air-gaps;
wherein the first flux pathway is parallel to the second flux pathway.

19. The solenoid as claimed in claim 18, further comprising a third flux pathway including fifth and sixth air-gaps and a fourth flux pathway including seventh and eighth air-gaps; wherein the first flux pathway is in series to the third flux pathway and the second flux pathway is in series to the fourth flux pathway, and the first and third flux pathways are parallel to the second and fourth flux pathways.

20. The solenoid as claimed in claim 13, further comprising:
a first flux pathway including the first and second air-gaps; and
a second flux pathway including the third and fourth air-gaps;
wherein the first flux pathway is in series to the second flux pathway.

21. The solenoid as claimed in claim 20, further comprising a third flux pathway including fifth and sixth air-gaps and a fourth flux pathway including seventh and eighth air-gaps; wherein the third flux pathway is parallel to the fourth flux pathway, and the first and second flux pathways are in series with the third and fourth flux pathways.

22. The solenoid as claimed in claim 20, wherein the stator includes a first portion and a second portion, and the coil is a first coil associated with the first portion of the stator.

23. The solenoid as claimed in claim 22, further comprising a second coil associated with the second portion of the stator.

24. The solenoid as claimed in claim 20, wherein the solenoid is a first solenoid, further comprising a second solenoid including identical features as the first solenoid, further comprising a common armature including a joining member connecting the armature of the first solenoid with the armature of the second solenoid.

25. The solenoid as claimed in claim 24, wherein adjacent plunger teeth are those of the first, second, third and fourth armature teeth of the first solenoid that are adjacent to those of the first, second, third and fourth armature teeth of the second solenoid along the common armature, wherein a distance between the adjacent plunger teeth is at least equal to a width of at least one of the adjacent plunger teeth.

26. The solenoid as claimed in claim 24, wherein the first solenoid is configured with respect to the second solenoid such that when the coils of the first and second solenoids are energized they exert forces or torques that pull the common armature in opposite directions.

27. The solenoid as claimed in claim 26, wherein the first and second armature teeth are configured with respect to the first and second stator teeth of the first solenoid spatially differently than how the first and second armature teeth are configured with respect to the first and second stator teeth of the second solenoid.

28. The solenoid as claimed in claim 26, wherein the first and second armature teeth of the first solenoid extend along or around a longitudinal axis of the armature with respect to the first and second stator teeth of the first solenoid respectively in an opposite direction compared to how the first and second armature teeth of the second solenoid extend along or around the longitudinal axis with respect to the first and second stator teeth of the second solenoid respectively.

29. The solenoid as claimed in claim 26, wherein the coil of the first solenoid includes windings and the coil of the second solenoid includes windings, wherein the coils of the first and second solenoids include an equal number of respective windings, such that when the coils of the first and second solenoids are energized with equal currents they exert forces or torques having a common magnitude to within a range of tolerance.

30. The solenoid as claimed in claim 26, wherein the coil of the first solenoid can be energized with an electric current independently and separately from the coil of the second solenoid.

31. The solenoid as claimed in claim 26, wherein the coils of the first and second solenoids are electrically connected.

32. The solenoid as claimed in claim 1, further comprising a driver configured to generate a primary control signal and a ripple signal, and including an adder to superimpose the ripple signal onto the primary control signal thereby providing an output signal, wherein the output signal is supplied to the solenoid.

33. The solenoid as claimed in claim 32, wherein the primary control signal includes a bias voltage.

34. The solenoid as claimed in claim 32, wherein a frequency of the ripple signal is above a predetermined value such that aliasing does not occur with the primary control signal or with a back electromotive force generated by applying the output signal to the solenoid.

35. The solenoid as claimed in claim 32, wherein the primary control signal is a DC voltage.

36. The solenoid as claimed in claim 1, further including an electronic controller programmed to:
measure a voltage across the coil;
measure a current through the coil;
estimate a position of the armature by employing an inductance-based algorithm providing a first standalone position estimate and a flux-linkage based or BEMF-based algorithm providing a second standalone position estimate; and
determine a combined estimate of the armature by employing a meta-estimation algorithm that combines the first standalone position estimate and the second standalone position estimate and provide a combined position estimate.

37. A solenoid comprising:
a split-core armature including a first core, a second core and a joining member connecting the first core with the second core, the joining member made from a non-ferromagnetic material, the split-core armature configured to move along a longitudinal axis;
a first coreless-electromagnet including a first coil extending around the longitudinal axis, the first core and the coil forming a first actuator, the first core having a north pole and a south pole when the first coil is energized;
a second coreless-electromagnet including a second coil extending around the longitudinal axis, the second core and the second coil forming a second actuator, the second core having a north pole and a south pole when the second coil is energized;
a first air-gap and a second air-gap, the first coil and the second coil are configured in one of the following ways:
1) The first air-gap extending between the north pole and the south pole of the first core whereby magnetic flux that leaves the north pole of the first core enters the south pole of the first core, and the second air-gap extending between the north pole and the south pole of the second core whereby magnetic flux that leaves the north pole of the second core enters the south pole of the second core when the first and second coils are energized; and 2) The first air-gap extending between the north pole and the south pole of the first core and the second core respectively whereby magnetic flux that leaves the north pole of the first core enters the south pole of the second core, and the second air-gap extending between the north pole and the south pole of the second core and the first core respectively whereby magnetic flux that leaves the north pole of the second core enters the south pole of the first core when the first and second coils are energized;

wherein the first coil and the second coil are spaced apart along the longitudinal axis, and the first core is configured with respect to the first coil and the second core is configured with respect to the second coil such that when the first and second coils are energized the first actuator exerts a first force that pulls the split-core armature in an opposite direction than a second force exerted by the second actuator on the split-core armature.

38. The solenoid as claimed in claim 37, wherein the first coil has first windings and the second coil has second windings, wherein a first number of first windings equals a second number of second windings.

39. The solenoid as claimed in claim 37, wherein the first coil is electrically connected to the second coil.

* * * * *